US009344441B2

(12) United States Patent
Kohout et al.

(10) Patent No.: US 9,344,441 B2
(45) Date of Patent: May 17, 2016

(54) DETECTION OF MALICIOUS NETWORK CONNECTIONS

(71) Applicant: Cisco Technology, Inc., San Jose, CA (US)

(72) Inventors: Jan Kohout, Roudnice nad Labem (CZ); Jan Jusko, Prague (CZ); Tomas Pevny, Prague (CZ); Martin Rehak, Prague (CZ)

(73) Assignee: Cisco Technology, Inc., San Jose, CA (US)

( * ) Notice: Subject to any disclaimer, the term of this patent is extended or adjusted under 35 U.S.C. 154(b) by 6 days.

(21) Appl. No.: 14/485,731

(22) Filed: Sep. 14, 2014

(65) Prior Publication Data

US 2016/0080404 A1 Mar. 17, 2016

(51) Int. Cl.
*H04L 29/06* (2006.01)

(52) U.S. Cl.
CPC ............ *H04L 63/1425* (2013.01); *H04L 63/20* (2013.01); *H04L 63/145* (2013.01)

(58) Field of Classification Search
None
See application file for complete search history.

(56) References Cited

U.S. PATENT DOCUMENTS

| 7,814,542 | B1 | 10/2010 | Day | |
|---|---|---|---|---|
| 8,661,544 | B2 | 2/2014 | Yen et al. | |
| 2003/0031193 | A1* | 2/2003 | Andrews | H04L 12/5693 370/412 |
| 2008/0162690 | A1* | 7/2008 | Karagounis | H04L 12/66 709/224 |
| 2010/0169476 | A1* | 7/2010 | Chandrashekar | H04L 63/1441 709/224 |
| 2010/0274893 | A1* | 10/2010 | Abdelal | H04L 29/0602 709/224 |
| 2013/0339526 | A1* | 12/2013 | Ruellan | H04L 67/2814 709/226 |
| 2015/0180898 | A1* | 6/2015 | Liljenstam | H04W 12/12 726/23 |

OTHER PUBLICATIONS

Bloom, Burton H.; "Space/Time Trade-Offs in Hash Coding With Allowable Errors"; Jul. 1970 (5 pages).
Breunig, Markus M.; "LOF: Identifying Density-Based Local Outliers" (12 pages).
Dagdee, Nirmal; "Intrusion Attack Pattern Analysis and Signature Extraction for Web Services Using Honeypots" (6 pages).
Fedynyshyn, Gregory; "Detection and Classification of Different botnet C&C Channels" (15 pages).
Giroire, Frederic; "Exploiting Temporal Persistence to Detect Covert botnet Channels" (18 pages).
Gu, Guofei; "Bothunter: Detecting Malware Infection Through IDS-Driven Dialog Correlation" (16 pages).
Gu, Guofei; "Botminer: Clustering Analysis of Network Traffic for Protocol- and Structure-Independent botnet Detection" (16 pages).
Kriegel, Hans-Peter; "Outlier Detection in Axis-Parallel Subspaces of High Dimensional Data" (8 pages).
Misbahuddin, Mohammed; "Dynamic IDP Signature Processing by Fast Elimination Using DFA"; Jul. 2009 (10 pages).

(Continued)

*Primary Examiner* — Hadi Armouche
*Assistant Examiner* — Andrew Steinle
(74) *Attorney, Agent, or Firm* — Stuart C. Atlow

(57) ABSTRACT

In one embodiment a method, system and apparatus is described for detecting a malicious network connection, the method system and apparatus including determining, for each connection over a network, if each connection is a persistent connection, if, as a result of the determining, a first connection is determined to be a persistent connection, collecting connection statistics for the first connection, creating a feature vector for the first connection based on the collected statistics, performing outlier detection for all of the feature vector for all connections over a network which have been determined to be persistent connections, and reporting detected outliers. Related methods, systems and apparatus are also described.

16 Claims, 28 Drawing Sheets

(56) References Cited

OTHER PUBLICATIONS

Noto, Keith; "FRAC: A Feature-Modeling Approach for Semi-Supervised and Unsupervised Anomaly Detection"; Data Mining and Knowledge Discovery, 25(1), pp. 109-133, 2011 (26 pages).
Papadimitriou, Spiros; "LOCI: Fast Outlier Detection Using the Local Correlation Integral"; 2003; (12 pages).
Shannon, C.E.; "A Mathematical Theory of Communication"; The Bell System Technical Journal; Jul. 1948 (45 pages).
Virustotal; "Virustotal—Free Online Virus Scan" (1 page).
Zeidanloo, Hossein Rouhani; "botnet Detection by Monitoring Similar Communication Patterns"; 2010 (10 pages).
Zhao, David; "Peer to Peer botnet Detection Based on Flow Intervals" (12 pages).

\* cited by examiner ation is implemented. The
DETECTION OF MALICIOUS NETWORK CONNECTIONS

TECHNICAL FIELD

The present disclosure generally relates to methods for revealing malicious long-term network connections.

BACKGROUND

Malware Command and Control (C&C) channels can take many shapes and forms—it can be centralized, point-to-point (P2P) based, fast-flux, etc. No matter what the channel type is, each malware instance must receive commands from a master which controls the malware continuously over time; otherwise the instance of malware could not fulfill its purpose. If the malware communicates with its controller via the centralized channel, it creates so called persistent connections between a compromised computer and a C&C server.

It is understood that referring to a network connection as a "persistent connection" indicates that the connection occurs repeatedly in time, it does not suggest that the connection is periodic or ongoing, or that every occurrence of the connection has the same properties.

The necessity to receive new commands from the controller and/or to upload stolen data suggests that every connection that is part of a C&C channel is also persistent. However, it does not hold true vice versa—not every persistent connection is malicious. In fact, most persistent connections are legitimate.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

A method, system and apparatus is described for detecting a malicious network connection, the method system and apparatus including determining, for each connection over a network, if each connection is a persistent connection, if, as a result of the determining, a first connection is determined to be a persistent connection, collecting connection statistics for the first connection, creating a feature vector for the first connection based on the collected statistics, performing outlier detection for all of the feature vector for all connections over a network which have been determined to be persistent connections, and reporting detected outliers. Related methods, systems and apparatus are also described.

EXEMPLARY EMBODIMENT

Malware (i.e. malicious software) refers to software designed to act on a computer in ways which are concealed from and typically unwanted by the user and/or owner of the computer. Viruses, worms, and spyware are typical examples of malware. It is appreciated that malware code need not be natively executable object code. Malware code may also include interpreted code, such as a script or an executable macro. An infected computer may then be formed as "botnets", which can then be used to inflict further harm, such as, but not limited to launching denial of service attacks, or for sending spam messages.

Figure 1:
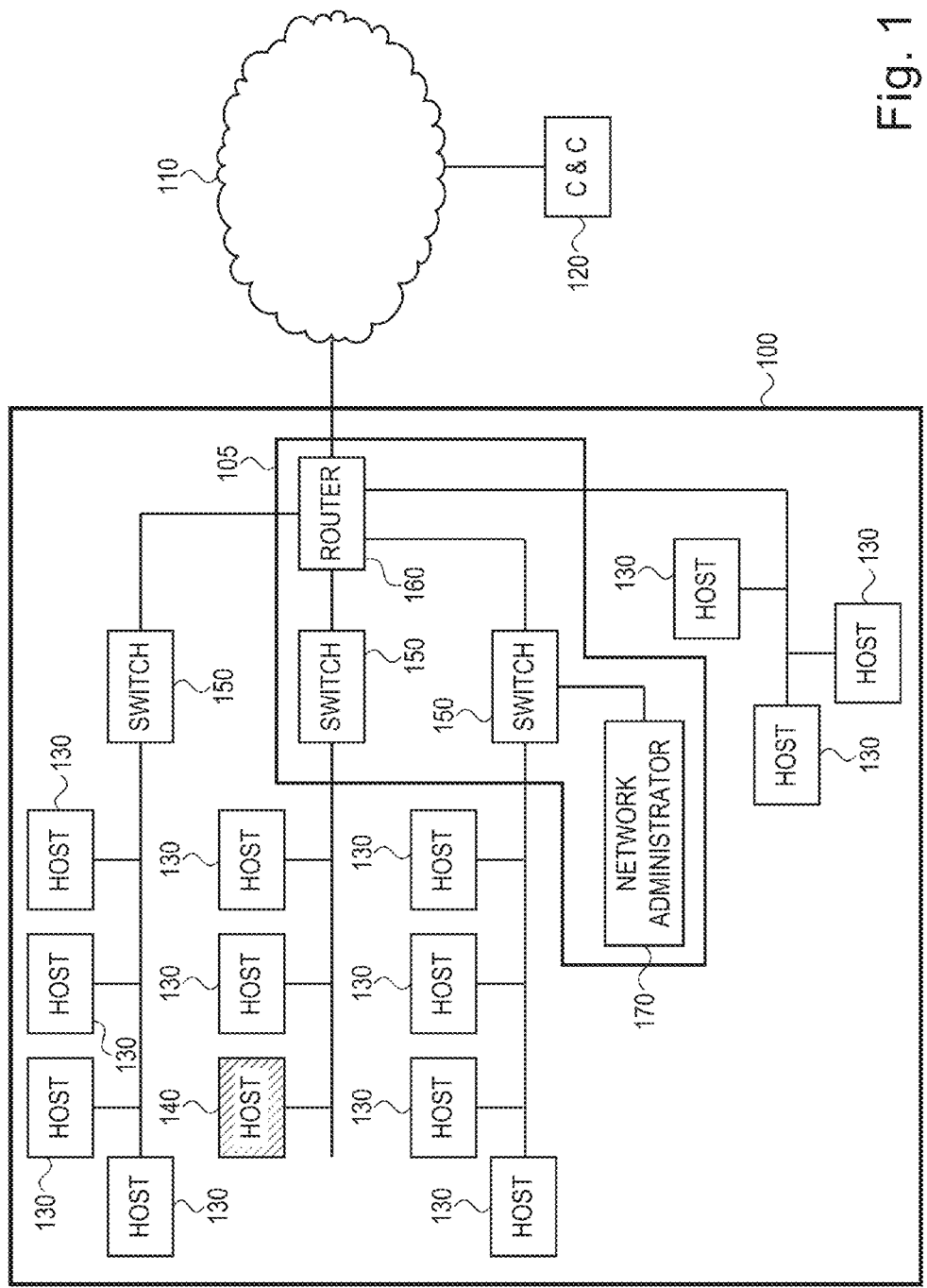
FIG. 1 is a simplified depiction of a network comprising a system on which an embodiment of the present invention is implemented.

Reference is now made to FIG. 1, which is a simplified depiction of a network 100 comprising a system 105 on which an embodiment of the present invention is implemented. The network 100 is connected to the Internet 110, a malware command and control server (C&C) 120 is also shown connected to the Internet 110. The network 100 is depicted in FIG. 1 in one particular configuration. However, any appropriate network configuration may, in fact, be found. The network 100 may comprise a corporate network, a university network, a home network, or any other alternative network 100. The network 100 may be a wired network, a wireless network, or any appropriate combination of wired and wireless networks, as is known in the art.

The network comprises a plurality of hosts 130, 140. Networking equipment, such as switches 150 and routers 160, as are known in the art, are used to join the hosts in order to form the network 100. Although not depicted, the network may also comprise repeaters, bridges and other appropriate networking equipment as is known in the art. At least one network administrator 170 is connected to the network 100. The network administrator 170 may be one of the host computers 130, a plurality of the host computers 130, or other appropriate device or devices used to monitor the network in the capacity of the network administrator 170. The system 105 constructed and operative in accordance with a first embodiment of the present invention referred to above comprises the networking equipment, such as switches 150, routers 160, bridges, and repeaters. The system 105 also comprises the network administrator 170.

It is appreciated that the term "hosts" 130, 140 refers to any appropriate computing device which connects to the network 100, supports users, and runs application programs. It is also appreciated that some or all of the hosts 130, 140 which are depicted as belonging to the network 100 may also be members of other networks which are not depicted in FIG. 1.

One of the hosts 140 on the network 100 is infected with malware, the malware being in communication with the C&C server 120. The C&C server 120, as is typical of C&C channels utilized by botnets and other malware can take many forms and employ various technologies to avoid detection. There is one property common to all C&C channels connections which cannot be avoided in order for a botnet to keep its utility. The members of the botnet, such as infected host 140, must maintain, over a long period, at least a sporadic connection with C&C server 120. As is known, for a bot (i.e. the host 140 which is infected with malware) to be useful, the bot must receive new commands from its master (i.e. the C&C server 120) and/or upload stolen or gathered data to the C&C server 120.

The infected hosts 140 termed "bots" above (only one depicted), may be viewed as clients to the C&C server 120. The C&C server 120 can be uniquely identified by a tuple: (ip address; port; and Transport/IP layer protocol). It follows that when looking for C&C channels which are hidden among other legitimate channels and connections open on the network 100, it is desirable to monitor connections to the (ip address; port; and protocol) tuple. Typically, in order to maintain a state of not being detected, these connections are lightweight—i.e. they occur only sporadically and only a few bytes are transferred with each connection.

Identifying Persistent Connections

Accordingly, a module which is implemented on at least one of the switches 150 and routers 160, or other networking equipment, uses a sliding window for each connection between the network 100 and a tuple (ip address; port; and protocol). Hereinafter, these connections will be denoted: IP <-> (ip address; port; and protocol). "IP" indicates an IP address of a host 130, 140 on the network 100. It is appreciated that although the above definition of the tuple refers to the host IP address, the local host side of the connection can be identified by any user's identity instead of the IP address if it is available in the data. For example, the local host MAC address may be used instead of its IP address. The sliding window, denoted an 'observation window', is composed of several "measurements windows", also denoted bins. Each bin is associated with a specific time interval. For example, bins may be of one hour intervals. If a request from a host 130, 140 on the network 100 is addressed to the tuple (ip address; port; and protocol) within a specific time interval, then the associated bin is assigned a value of 1. Otherwise, the associated bin is assigned a value of 0. Accordingly, the persistence, p, of a connection is then calculated as:

$$p(c, W) = \frac{1}{n}\sum_{i=1}^{n} 1_{c,b_i}$$

where:
c is the connection in question;
$W=[b_1, \ldots b_n]$ is the observation window composed of n measurement windows; and
$1_{c,b_i}$ is a function which is equal to 1 if the connection was active at least once during the measurement window $b_1$, otherwise the function $1_{c,b_i}$ is equal to 0.

Putting the above definition of persistence into words, the persistence, p, of a connection is the percentage of the number of bins in the observation window in which the connection was active.

The above equation gives the same weight to a lightweight connection, which occurs only sporadically and only a few bytes are transferred with each connection, as it does to more heavy traffic connections, since, once there is any activity at all during the time span of the bin, the bin is assigned a value of 1. A connection is considered to be persistent if its persistence, as determined using the above equation exceeds a persistence threshold which is set by the network administrator 170 on the basis of prior knowledge, experimentation, or some combination of both. The authors of Exploiting Temporal Persistence to Detect Covert Botnet Channels (Giroire, Frederic and Chandrashekar, Jaideep and Taft, Nina and Schooler, Eve and Papagiannaki, Dina, In *Proceedings of the 12th International Symposium on Recent Advances in Intrusion Detection* RAID '09, Saint-Malo, France, 326-345, Springer-Verlag), have reported that "less than 20% of the destination atoms have a persistence value greater than 0.2", i.e. less than 20% of all connections have persistence, as determined using the above equation, higher than 0.2. It is appreciated that the definition of persistence, p, stated above, $$\text{i.e., } p(c, W) = \frac{1}{n}\sum_{i=1}^{n} 1_{c,b_i}$$

is a modification of the definition of persistence introduced in the paper by Giroire, et al.

The statement that "less than 20% of the destination atoms have a persistence value greater than 0.2" is in agreement with the above stated assumption that most connections are active sporadically or only once. Therefore, choosing a threshold persistence value in the range of 0.5 to 0.8 to define persistent connections seems reasonable based on this.

The size of the observation window determines how long all connections are tracked (i.e. the 'memory' of the above stated method). The size of a single bin determines the resolution of the method. If the observation window consists of ten bins and each bin represents a one-hour long interval, then the method is well suited to track bots which contact their C&C servers 120 once every half an hour or once every hour. However, a bot which communicates with its C&C servers 120 only once a day will, most likely, not be noticed using ten bins each of which is an hour in duration.

In that not all bots connect to the C&C server 120 with the same or even similar intervals, it cannot be stated in advance what time intervals should be used for bins. Therefore, several different bin sizes (i.e. different durations) are used simultaneously in order that the method described above is invoked with several different resolutions. As such, it becomes possible to detect connections which occur every hour as well as connections which occur on the order of once a day. Accordingly, a typical system may run with several observation windows with the same number of bins in each observation window, but each of the observation window's bins are different time intervals in length. Accordingly, there may be several measured persistence values for a single connection. In that case, the overall persistence of the connection may be determined as a maximum persistence over the range of resolutions measured:

$$p(c, W) = \max_{j} p^{j}(c, W),$$

where $p^j$ is persistence for given bin size.

Identification of Outliers

Once persistent connections are identified, malicious connections should then be identified among the identified persistent connections. It is appreciated that while active connections to C&C servers 120 should be persistent, not all persistent connections are, in general, connections to C&C servers 120. Typically, most of the persistent connections are found to be connections to servers operated by Google, Facebook, Twitter, Microsoft, and Akamai. Empirical data available to the inventors of the present invention for test datasets of network connections on both a university network and a corporate network indicate that nearly 75% of all persistent connections are with one of ten most frequently visited Autonomous systems (the datasets are discussed in greater detail below). Prior art systems not utilizing persistence of connections have utilized a learning period to learn how to distinguish between "legitimate" and "malicious" connections. All connections which were observed in the learning phase were whitelisted—regardless of whether, in fact, said connection was a malicious or a legitimate connection. Only a new connection which is not on the white list is flagged for further investigation. The clear drawback of the prior art approach is that once a malicious connection is marked as legitimate in the learning phase, it becomes very difficult, to later identify that connection as a malicious connection.

Embodiments of the present invention utilize outlier detection described later, in order to separate malicious and legitimate persistent connections. However, persistent connections generally do not, inherently, have properties based on which outliers can be identified. Therefore, statistics for several features for each persistent connection are collected in order to create a feature space. Each persistent connection is then able to be represented as a numerical vector in the feature space. These numerical vectors in turn are used as an input for a method by which outliers may be detected.

The statistics collected, as mentioned above, are only collected for observed persistent connections. It was noted above that choosing a threshold persistence value in the range of 0.5 to 0.8 seems reasonable. However, once a connection exceeds a lower persistence threshold, say 0.4, it may then become flagged as a connection of interest, and the statistics may also then be collected for that connection. Thus, should a connection already flagged as a connection of interest later be flagged as a persistent connection, then statistics are readily available for that connection sooner, so that the identified connection can undergo outlier detection.

Figure 2A:
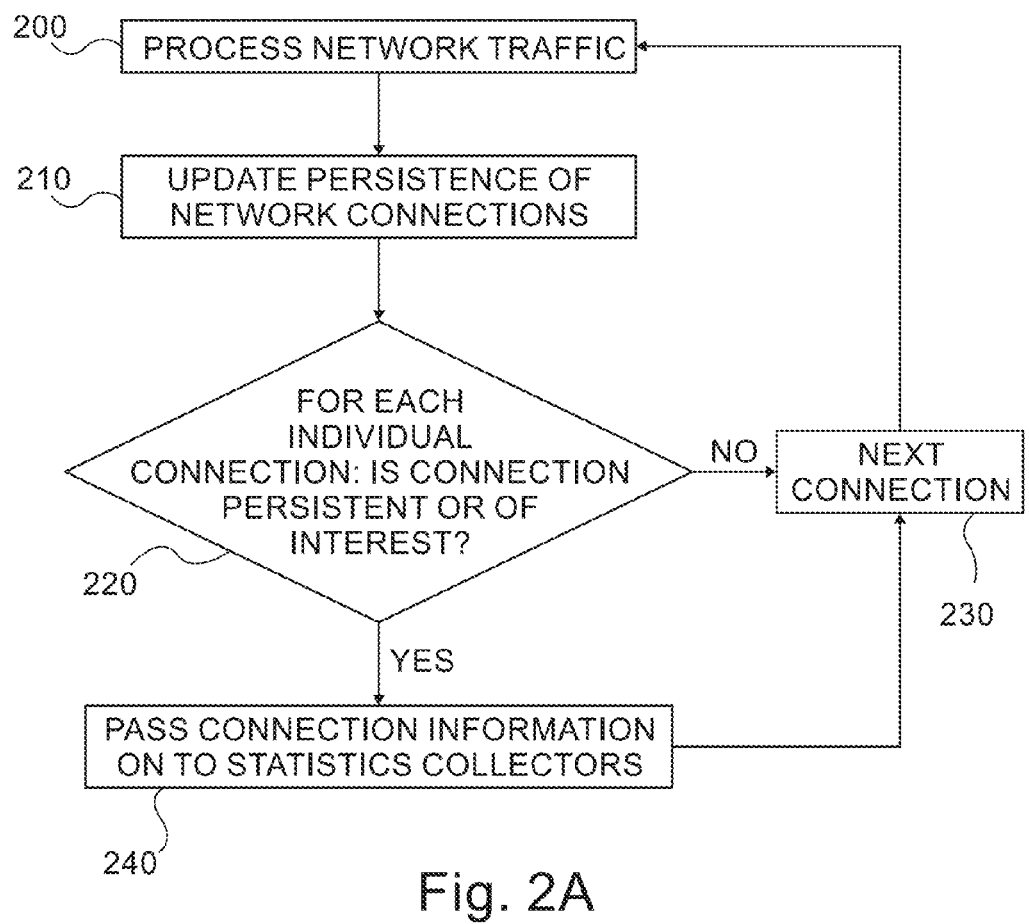
FIG. 2A is a flowchart diagram of a first loop comprised in the method utilized by the system of FIG. 1.

Reference is now additionally made to FIG. 2A, which is a flowchart diagram of a first loop comprised in the method utilized by the system of FIG. 1. The first loop is run at short intervals of time, for instance, every five minutes. Network traffic data is received from the networking equipment such as repeaters, bridges, switches 150 and routers 160 throughout the network 100. The network traffic data may represent massively large numbers of network connections, depending on the network size. For very large networks, there may be millions of connections. Network traffic is processed as described in the following paragraphs (step 200). Processed network traffic is used in order to update persistence of network connections (step 210), as discussed above.

The method then processes each one of the individual network connections received in step 200. For each individual connection, it is determined if the connection is a persistent connection or a connection of interest (step 220). If the particular individual connection being analyzed is not one of a persistent connection or a connection of interest, then the next connection is analyzed (step 230). If the connection is identified as being one of a persistent connection or a connection of interest, then statistics about the identified connection are passed on to statistics collectors (step 240) which are disposed in the monitoring system.

The loop of FIG. 2A may be viewed as executing the following steps of pseudo-code:

```
every loop_interval minutes:
    for each flow f:
        updatePersistence(f);
        if       (isPersistent(f)        OR
isOfInterest(f))
            recordStatistics(f)
        end
    end
end
```

It is appreciated that the term "flow", as used above, refers to the flow of network traffic through a connection, and therefore, may be viewed as the connection itself.

Figure 2B:
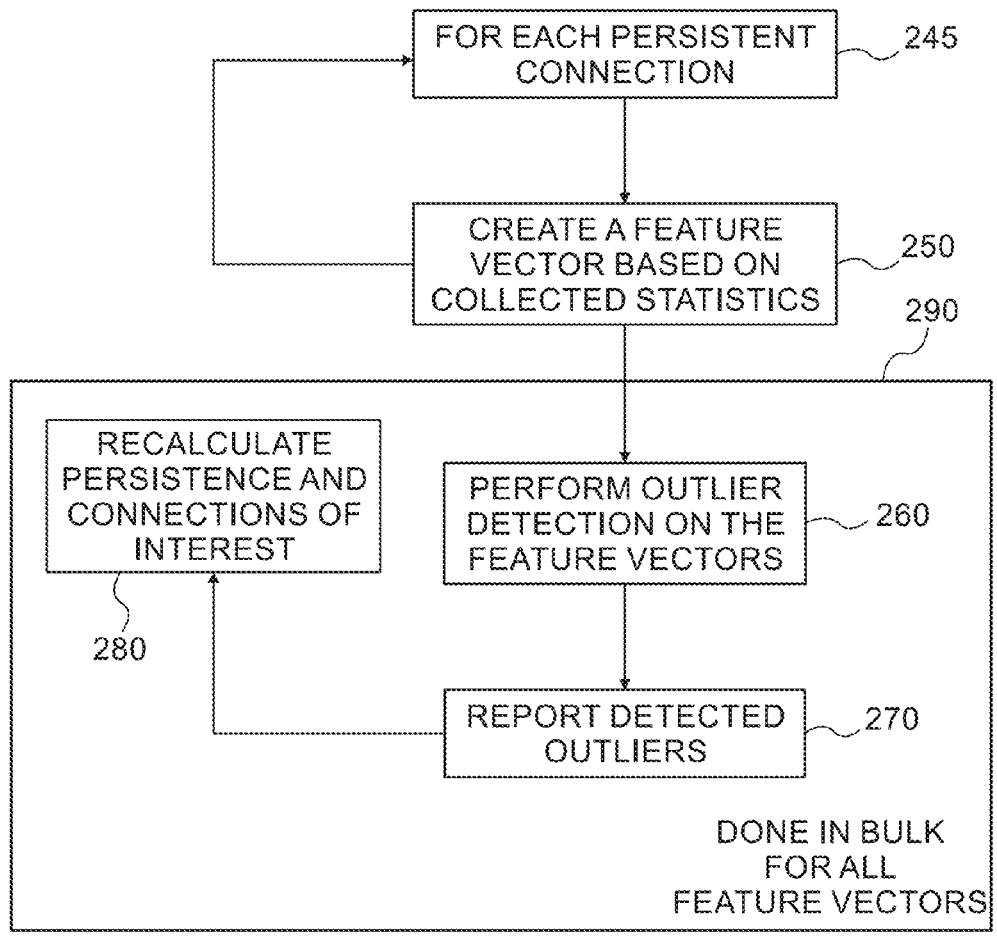
FIG. 2B is a flowchart diagram of a second loop comprised in the method utilized by the system of FIG. 1.

Reference is now made to FIG. 2B, which is a flowchart diagram of a second loop comprised in the method utilized by the system of FIG. 1. The loop of FIG. 2B is performed at intervals of once every bin size (e.g., if the bin size is one hour, the loop of FIG. 2B is performed once every hour). It is appreciated that the bin size may vary, or may be configured as needed. After persistent connections are identified using the loop of FIG. 2A, a second loop is run for each of the identified persistent connections (step 245). A feature vector is created for each of the identified persistent connections on the basis of the statistics collected for that connection (step 250). Feature vectors creation and properties are discussed in greater detail below. The loop continues until feature vectors are created for all of the persistent connections. Once the vectors are ready, the outlier detection takes place resulting in identification of which persistent connections are outlying (step 260).

The connections which are outliers are identified (in step 260). Those identified connections are then reported to the network administrator 170 (step 270). The persistence of connections and connections of interest are then predetermined by the system (step 280). It is appreciated that box 290 aggregates steps 260, 270, and 280. This is because these three steps are performed in bulk for all of the feature vectors created in step 250.

FIG. 2B may be viewed as execution of the following steps of pseudo-code:
    every loop_interval:
    for each persistent connection pc:
        create_feature_vector (pc)
    end
    perform_outlier_detection
    recalculate persistence In typical embodiments of the present invention, the method discussed in FIG. 2A, is implemented at statistics collectors located at the networking equipment such as repeaters, bridges, switches 150 and routers 160, and is performed periodically, for example, at five minute intervals (i.e., loop_interval, in the pseudo code, is 5 minutes). Typically, the method discussed in FIG. 2B, where feature vectors are constructed and outlier detection is performed occurs once an hour (i.e., loop_interval, in the pseudo code, is 1 hour). It is appreciated that 1 hour is given as an exemplary time, and other appropriate times might be used instead of 1 hour.

The term "feature" as used herein is understood to refer to a property of the object on an operation is performed. For example, the feature, "average flow duration" is a property of the particular persistent connection being analyzed.

Feature vectors are formed by taking the values for more than one of the features in the list of selected features, and arranging those values in a vector array.

In order to perform outlier detection, outliers are defined as anomalies having a score $s_c$ of the persistent connection denoted c represented by a feature vector $v^c$, as given by the following equation:

$$s_c = \Sigma -\log p_i(v_i^c)$$

where $p_i$ is an estimated probability density function for feature i, and $v_i^c$ is the $i^{th}$ element (that is to say a value of the feature i) of the feature vector $v^c$. The sum $s_c$ is over all features, i.e., i=1, . . . , $n_F$ where $n_F$ is the total number of features. An anomaly having a score 5, above some preset value is then considered to be an outlier. The concrete values of the threshold which would be used in production depends on the given network environment, but one example can be that some quantile will be used. For example, and without limiting the generality of the foregoing, the 10% most anomalous connections will be reported as outliers. In this case, the threshold would be set to the value for which it holds that 90% of connections have their anomaly scores below this value and 10% have their anomaly scores greater or equal to that value.

Those of skill in the art might interchange the above equation for outlier determination with the definition of Shannon entropy. By way of example, consider two connections, $c_1$ and $c_2$. By way of example, let all the features of $c_1$ have an empirical probability $p_i(v_i^c)$=0.1 and values of all features for connection $c_2$ have an empirical probability $p_i(v_i^c)$=0.3. Thus, $c_1$ should have a higher anomaly score than $c_2$. However, the Shannon entropy for feature values probabilities for $c_1$, is computed as $-\Sigma 0.1 \log 0.1$, which is lower than the Shannon entropy for $c_2$, which is computed as $-0.3 \log 0.3$.

It is appreciated that the motivation for using the given definition of anomaly scores is that the score should be higher the less probable are the feature values for the persistent connection c, which is not the case for Shannon entropy.

It is further appreciated that this definition of outlier-ness is not based on some arbitrary number of nearest neighbors of persistent connection for which outlier-ness is being determined, but rather on a whole attribute distribution. Therefore, this definition is more resilient to small changes in the feature space or additional and/or missing entities. Moreover, when collecting features for a window of several hours, it is possible to use "floating" statistics, wherein statistics for one hour are calculated and the overall statistics over several hours are then aggregated. Although the techniques used to implement "floating" statistics depend on the type of statistic collector, nonetheless, each statistic collector holds data for each hour separately and when the aggregated data are needed, it merges them together. Using floating statistics, as described ensures empirical distribution stability in time of the gathered statistics in contrast to a case where after each time interval of interest all data are dropped and statistics are then, per force, recalculated from scratch.

Figure 3A:
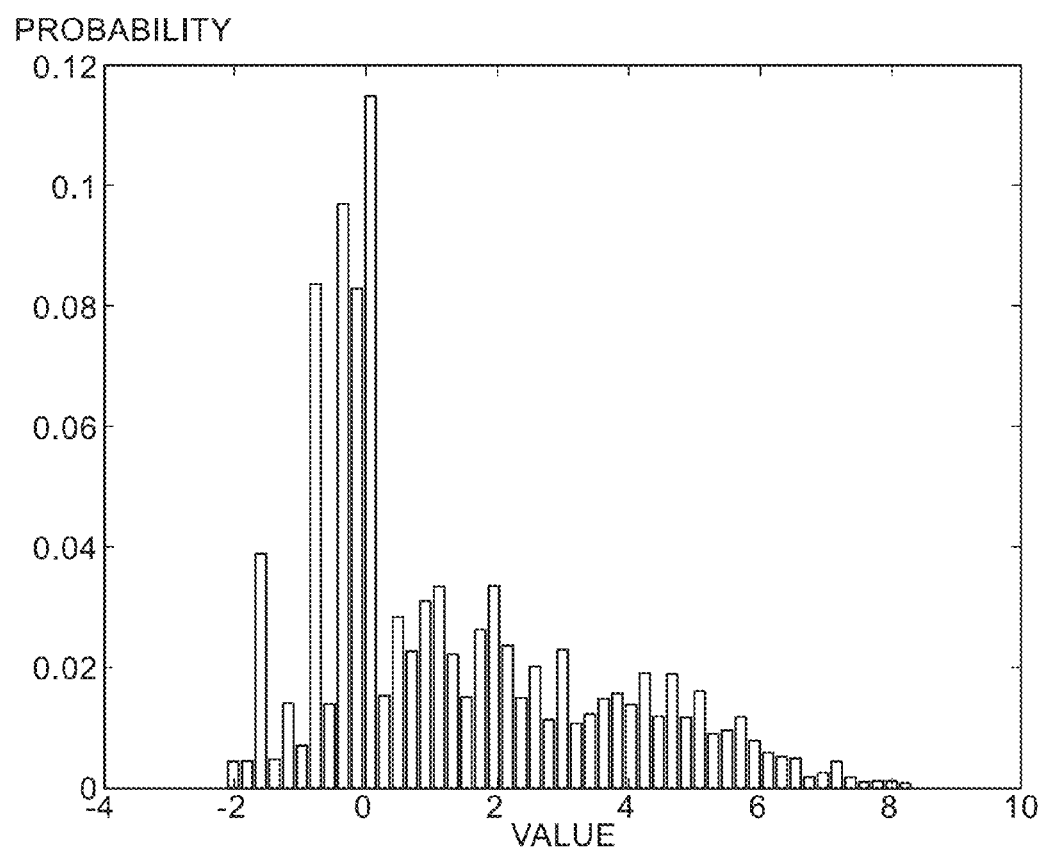
FIGS. 3A-3C are exemplary empirical distributions of feature values for the exemplary target autonomous system overall surprisal feature over time, the distributions gathered within the system of FIG. 1.
Figure 3B:
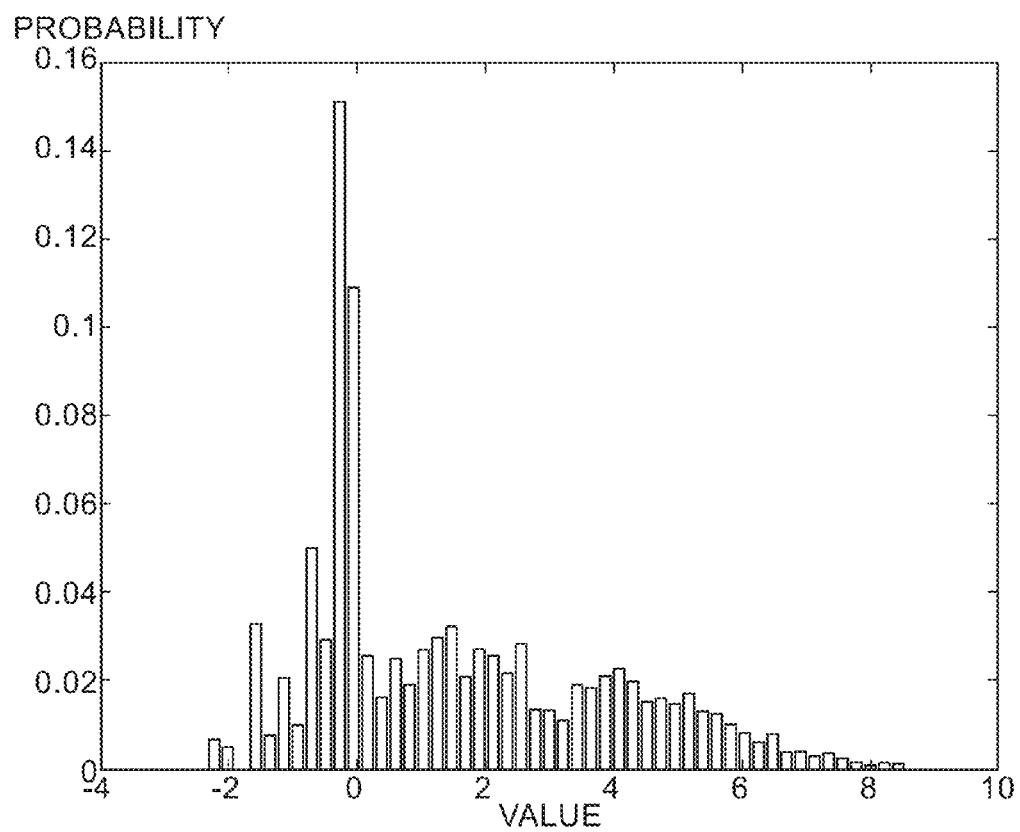
Figure 3C:
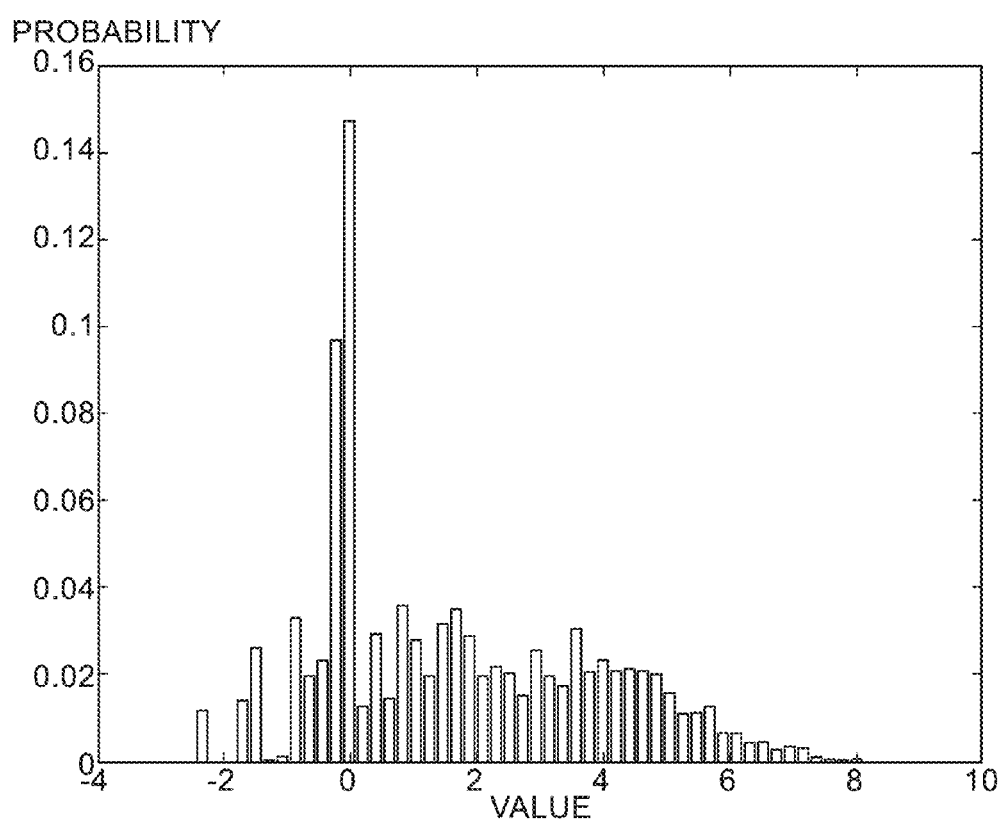

Reference is now made to FIGS. 3A-3C, which are exemplary empirical distributions of feature values for the exemplary target autonomous system overall surprisal feature (defined below) over time, the distributions gathered within the system of FIG. 1. FIG. 3A shows the probability of finding a given value of the target autonomous system overall surprisal feature after 8 hours. FIG. 3B shows the probability of finding a given value of the target autonomous system overall surprisal feature after 16 hours. FIG. 3C shows the empirical probability of the target autonomous system overall surprisal feature after 24 hours. The term "surprisal", in all of its grammatical forms, is understood to mean a value of $-\log(p)$, where p is some probability value. Surprisal is discussed in depth in K. Noto, C. E. Brodley, and D. Slonim. FRaC: A Feature-Modeling Approach for Semi-Supervised and Unsupervised Anomaly Detection. *Data Mining and Knowledge Discovery*, 25(1), pp. 109-133, 2011

The inventors of the present invention, based on their tests on actual network data have selected the following set of features for use in forming the feature space used to practice many embodiments of the present invention. A large potential pool of features was tested, with an eye to reducing the number of members of that pool, in order that issues such as memory requirements not become problematic. Feature selection was used in order to determine an appropriate number and combination of features which should be used to form the feature space to be used. It was observed that none of the features individually provided a definitive separation between the malicious and legitimate persistent connections. The method used to perform feature selection will be described further below. It is appreciated that the following list is provided as a non-exhaustive exemplary list of features, and other appropriate features may also be used in some embodiments.

LIST OF SELECTED FEATURES

Average flow duration—this feature measures the average duration in millisecond of outgoing flows that belong to the same persistent connection.

Flows inter-arrival times mean—for each persistent connection, this feature computes the mean of times between consecutive outgoing flows belonging to that connection.

Flows inter-arrival times variance—this feature measures the variance of time intervals between consecutive outgoing flows for the given persistent connection.

Target autonomous system overall surprisal—(see FIGS. 3A-C) target autonomous systems of all observed persistent connections are monitored. Then an empirical probability distribution for all such connections is built, giving the estimation of the probability of visiting each autonomous system by a persistent connection. As a feature value for the given connection, the normalized surprisal value, $-(\log p)$-H, where p is the probability value, and H is the entropy of the empirical distribution of all target autonomous systems, also defined in Noto, et al.) is determined from the probability distribution. Accordingly, the lower number of requests to a particular target autonomous system from all users in the network 100, the higher the normalized surprisal value for that autonomous system.

Target autonomous system per-service surprisal—this feature is similar to the target autonomous system overall surprisal feature. However, the autonomous system per-service surprisal feature computes surprisal for the target autonomous system based on the remote service used by the given persistent connection. For each distinct remote service type represented by the above-mentioned tuple of (ip address; port; and protocol), a separate empirical distribution of is used.

Unique local ports count—this feature comprises the number of distinct port numbers that were used in the given persistent connection on the local side of the connection (i.e. on a host 130, 140 within network 100). As the persistent connection within network 100 is determined only by the IP address of the host 130, 140, the host 130, 140 can make connections from different ports within one persistent connection.

Number of bytes weighted by target autonomous system exclusivity—the value $f_c$ for this feature for persistent connection c with target remote autonomous system A is given by:

$$f_c = \log b_c \cdot \log\left(\frac{n}{n_A}\right)$$

where $b_c$ is the total number of bytes sent by the connection c, n is the total number of users (i.e. hosts 130, 140) in network 100, and $n_A$ is the number of users in network 100 who have at least one persistent connection to the autonomous system A. It is appreciated that one persistent connection can include only one local host 130, 140.

User overall daily activity match—a daily activity profile is maintained for each user, the daily activity profile comprising an empirical probability distribution of all of the user's NetFlow starting times over the day. The term "Netflow" is understood to mean a network flow comprising a unidirectional sequence of packets that all share the following 7 values:

1. Ingress interface (i.e. SNMP ifIndex);
2. Source IP address;
3. Destination IP address;
4. IP protocol;
5. Source port for UDP or TCP (0 for other protocols);
6. Destination port for UDP or TCP, type and code for ICMP (0 for other protocols); and
7. IP type of service.

Netflow is a Cisco® standard which is well known in the art.

When calculating a value for the user overall daily activity match for a given persistent connection c belonging to a user U, the surprisal values (as discussed above, with reference to FIGS. 3A-3C) of the starting times of all of the netflows $f_1, \ldots f_n$ belonging to connection c are calculated, with respect to user U's daily activity profile. That is to say, surprisals $s_i = -\log(p(f_i))$, where $p(f_i)$ is a probability of the starting time of flow $f_i$, empirically determined from the daily activity profile of user U. The feature value for connection c is the calculated mean value of values $s_1, \ldots s_n$. In other words, the user overall daily activity match provides a measure of how much the activity within persistent connection c matches the user's overall behavior.

Remote service entropy—for each user in the protected network 100 this feature holds a histogram H of visit counts of all service types represented by pairs, i.e. (port, protocol) based on the persistent connection remote services of that user. The feature value for a given persistent connection c is then given by the entropy of service type histogram H of the user of the local endpoint of the persistent connection c. The calculation of entropy is performed using standard techniques known in the art (i.e. using Shannon's equation). It is appreciated that the 'user' can be identified by a duple of (userID, MAC), where the user ID identifies a particular user using a particular device, and the MAC is the MAC address of the particular device. Using this duple enables the system to distinguish between different connections on two different devices, both belonging to the same user. The MAC address is used, rather than the IP address, in order to avoid DHCP changes of the IP address of the particular device.

Remote service ratio—this feature uses a list S of remote service endpoints visited by each user by persistent connections. The feature value $f_c$ for any connection c to remote service s is computed according to the formula:

$$f_c = \frac{|S'|}{|S|}\log|S|$$

where $S' \subseteq S$ is a list of all remote service endpoints having the same port and protocol as the remote service s.

The above list of features were selected using backwards feature selection, as described below. Other features which were tested but not selected by the backwards feature selection included:

Logarithm of the total amount of bytes sent or received within the persistent connection.

Autocorrelation of time series generated by sent bytes of packets within the persistent connection. The inventors of the present invention tested two versions of this autocorrelation feature: one using a complete time series; and another one using an original time series with skipped zero values.

Ratio of bytes sent and received by host within the persistent connection.

In order to identify the best subset of all of the defined features that provided good detection performance, backward feature selection was performed on empirically performed measurements of actual large networks for each of the above listed features. Backward feature selection starts with the full set of the above mentioned features and in each step it removes the worst feature. It continues until it ends up with a single feature. At that stage, there are possible sets of features and one is chosen that provides the best results. The inventors of the present invention used an average area under all hourly created receiver operating characteristic (ROC) curves as the quality criterion. ROC curves are well known in the art as being graphical plots which illustrate the performance of a binary classifier system as the system's discrimination threshold is varied.

Average areas under curves (AUCs) were computed for all hourly generated ROC curves in three different datasets, in order to prevent overfitting (i.e. describing random error or noise instead of the underlying relationship) of selected features to specific data.

The ROC curves are discussed below in greater detail with reference to FIGS. 6A-8, as well as the discussion of analysis of empirical results, below.

Reference is now made to FIGS. 4A-4J, which are exemplary empirical distributions of feature values determined to be useful for measuring outliers in the system of FIG. 1, as empirically determined from a test dataset. These features are defined above. The empirical probability determined using all connections in the actual dataset is depicted in clear, outlined histograms in the figures. The shaded distributions in FIGS. 4A-4J illustrate distributions of feature values for malicious-only connections. The empirical distribution curves of FIGS. 4A-4J are derived using a ground truth (defined below). The values of statistics for malicious and legitimate persistent connections are determined by the ground truth (as discussed below).

Figure 4A:
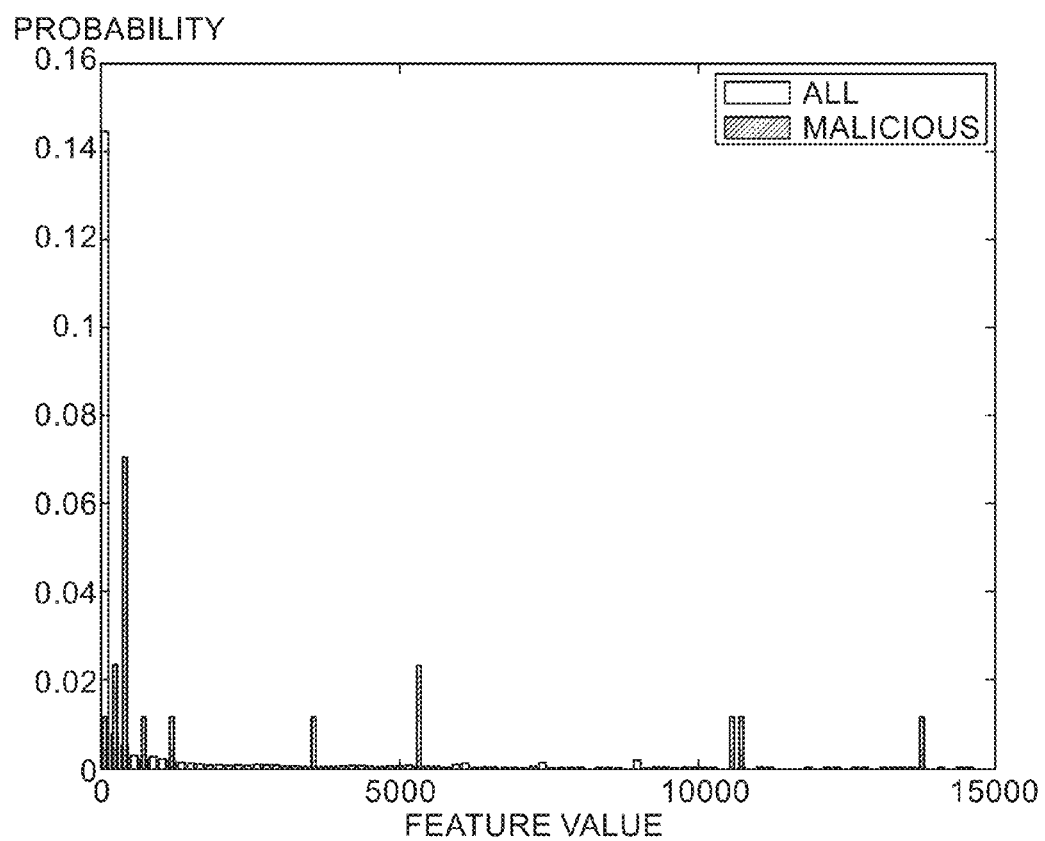
FIGS. 4A-4J are exemplary empirical distributions of feature values for the features determined to be useful for measuring outliers in the system of FIG. 1, as empirically determined from an actual dataset.

FIG. 4A is an empirical distribution of the average flow duration feature showing and contrasting the probability of various feature values for all connections and malicious connections in the actual dataset.

Figure 4B:
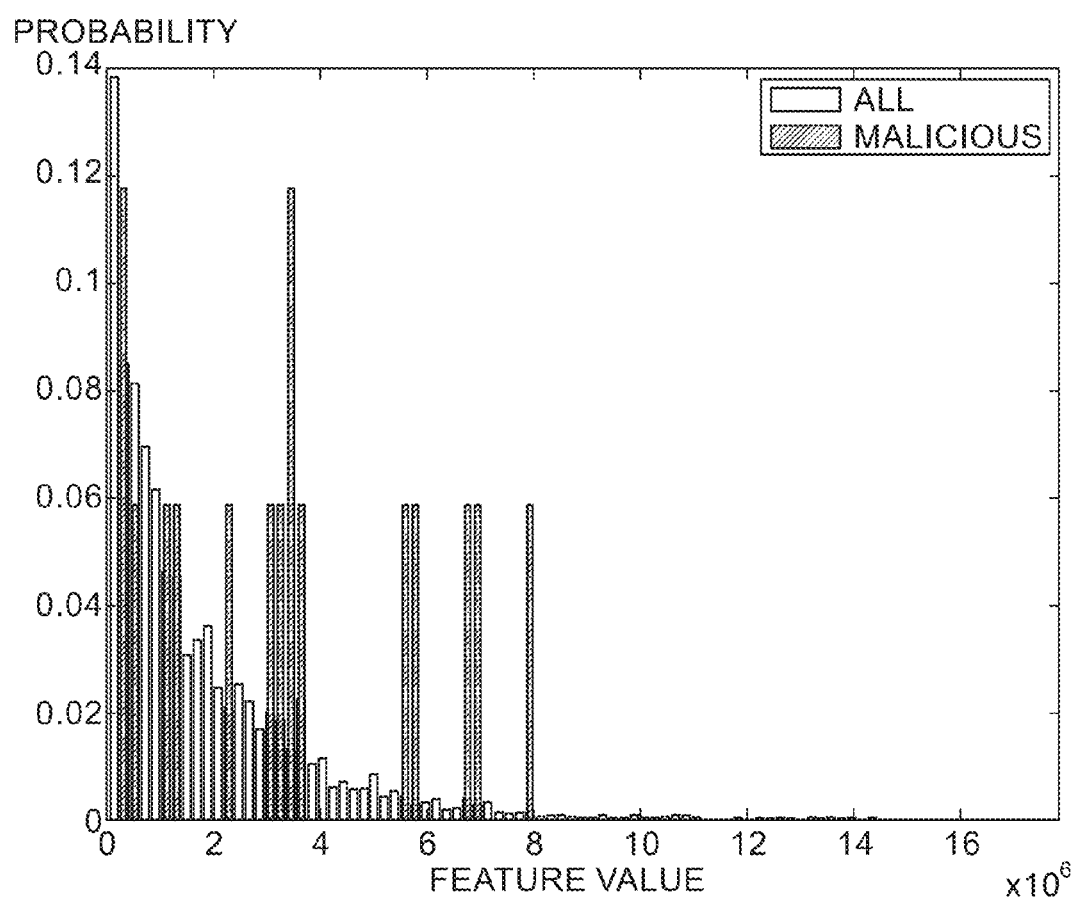

FIG. 4B is an empirical distribution of the inter-arrival times mean feature showing and contrasting the probability of various feature values for all connections and malicious connections in the actual dataset.

Figure 4C:
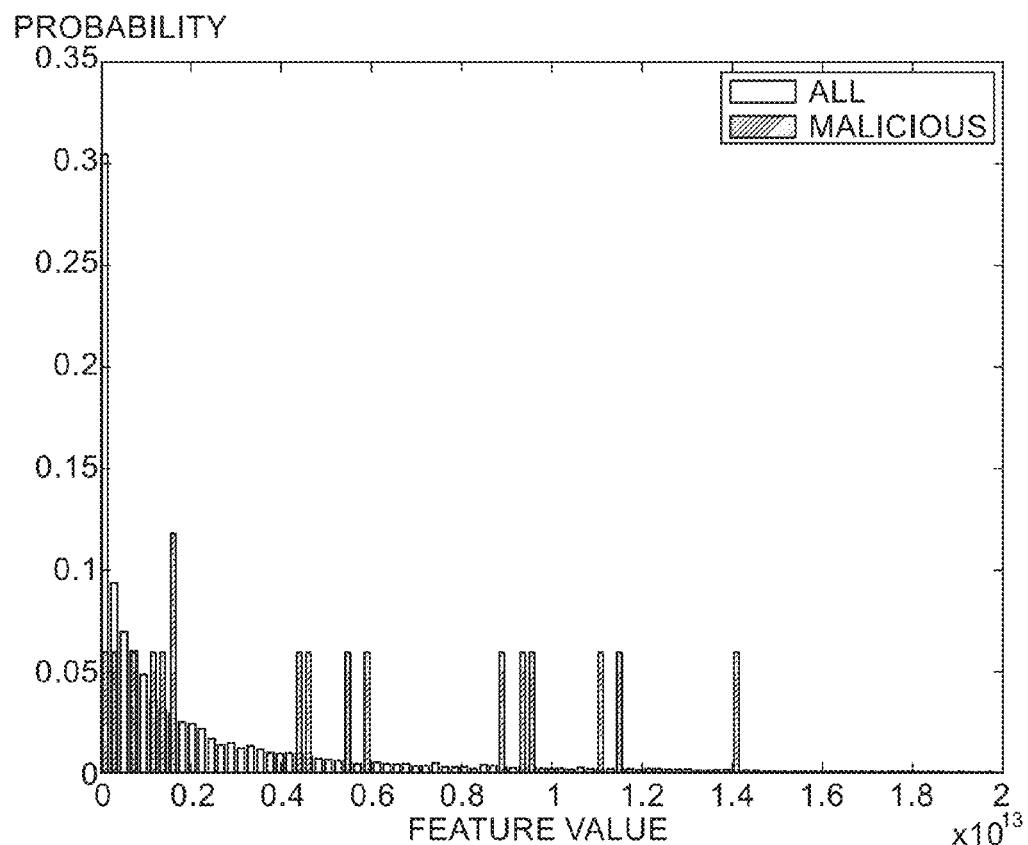

FIG. 4C is an empirical distribution of the inter-arrival times variance feature showing and contrasting the probability of various feature values for all connections and malicious connections in the actual dataset.

Figure 4D:
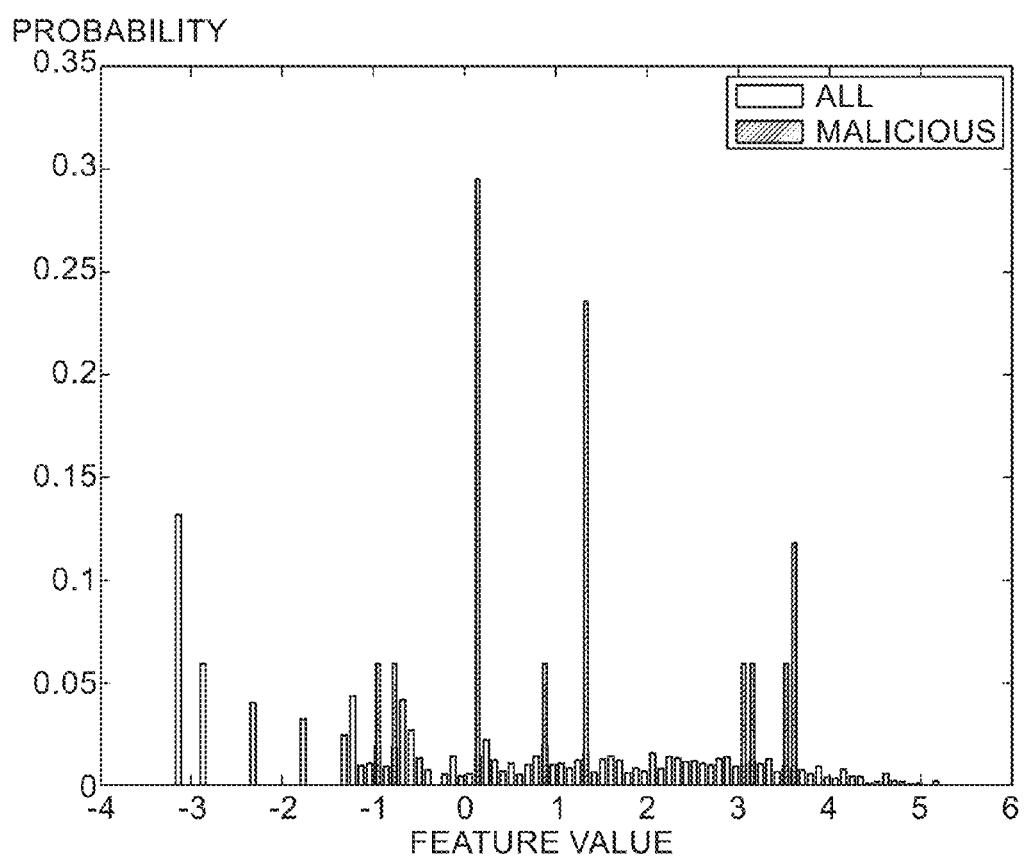

FIG. 4D is an empirical distribution of the target autonomous system overall surprisal feature showing and contrasting the probability of various feature values for all connections and malicious connections in the actual dataset.

Figure 4E:
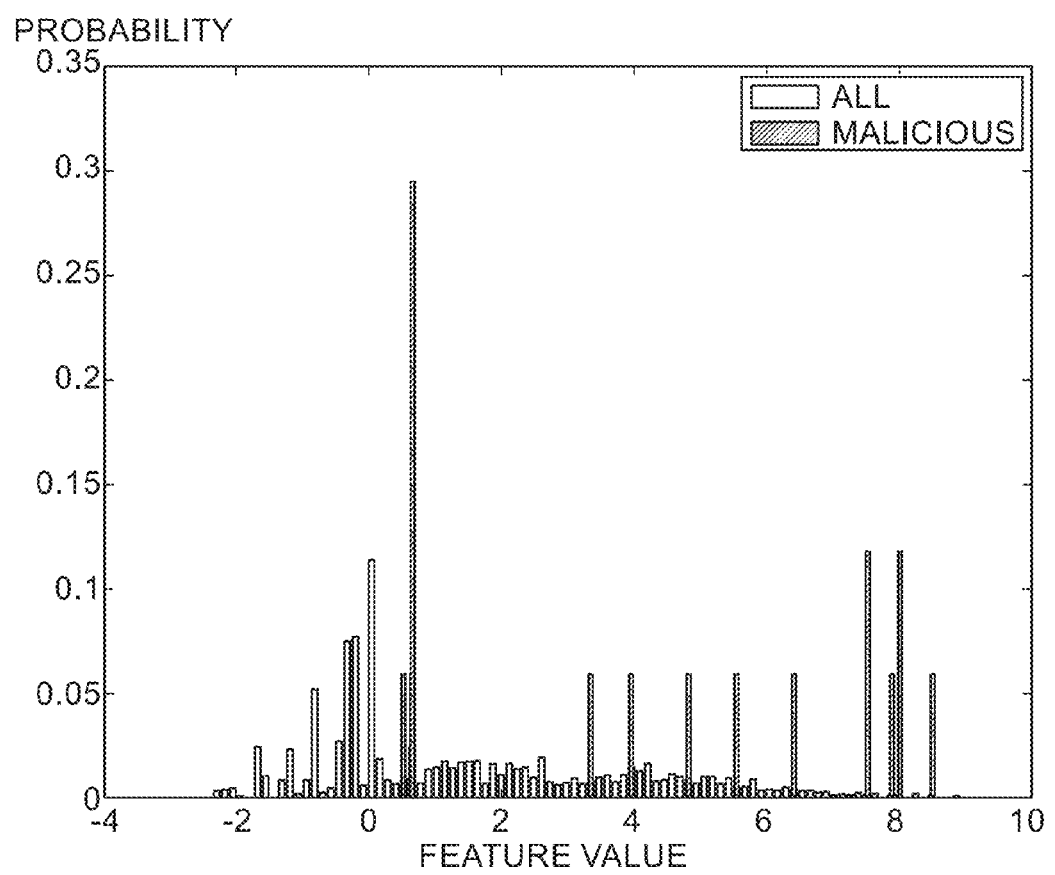

FIG. 4E is an empirical distribution of the target autonomous system per-service surprisal feature showing and contrasting the probability of various feature values for all connections and malicious connections in the actual dataset.

Figure 4F:
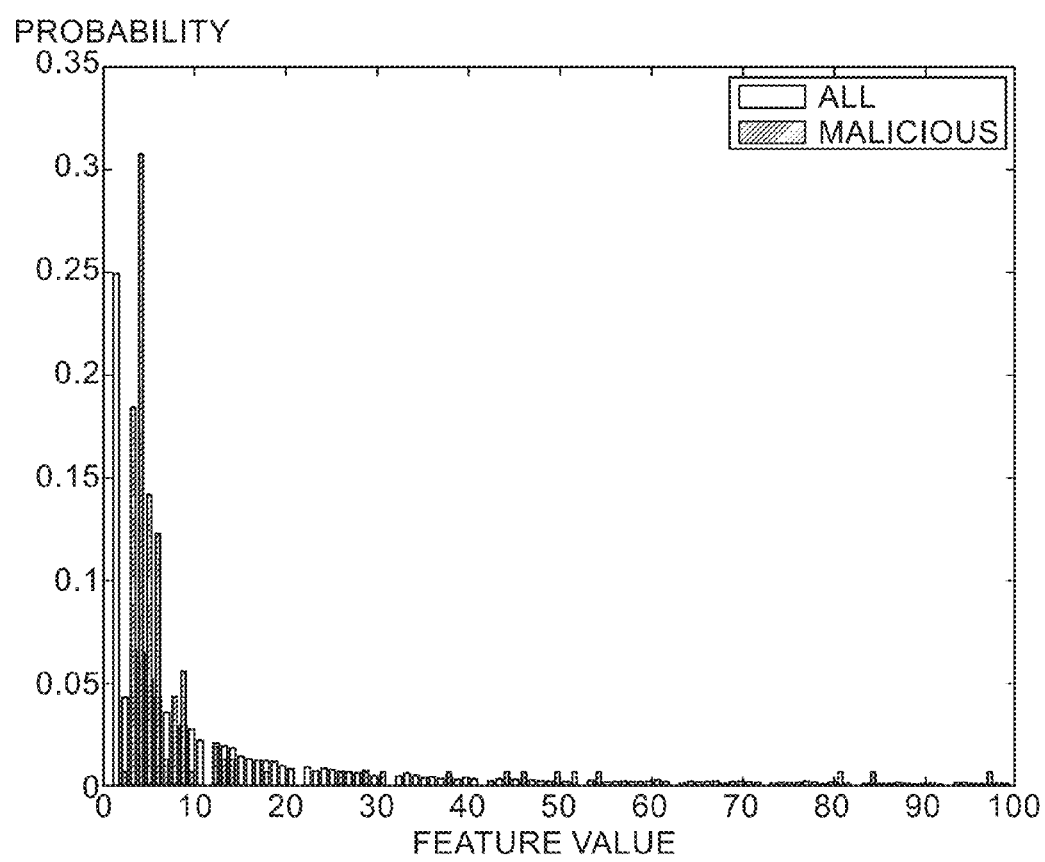

FIG. 4F is an empirical distribution of the unique local ports count feature showing and contrasting the probability of various feature values for all connections and malicious connections in the actual dataset.

Figure 4G:
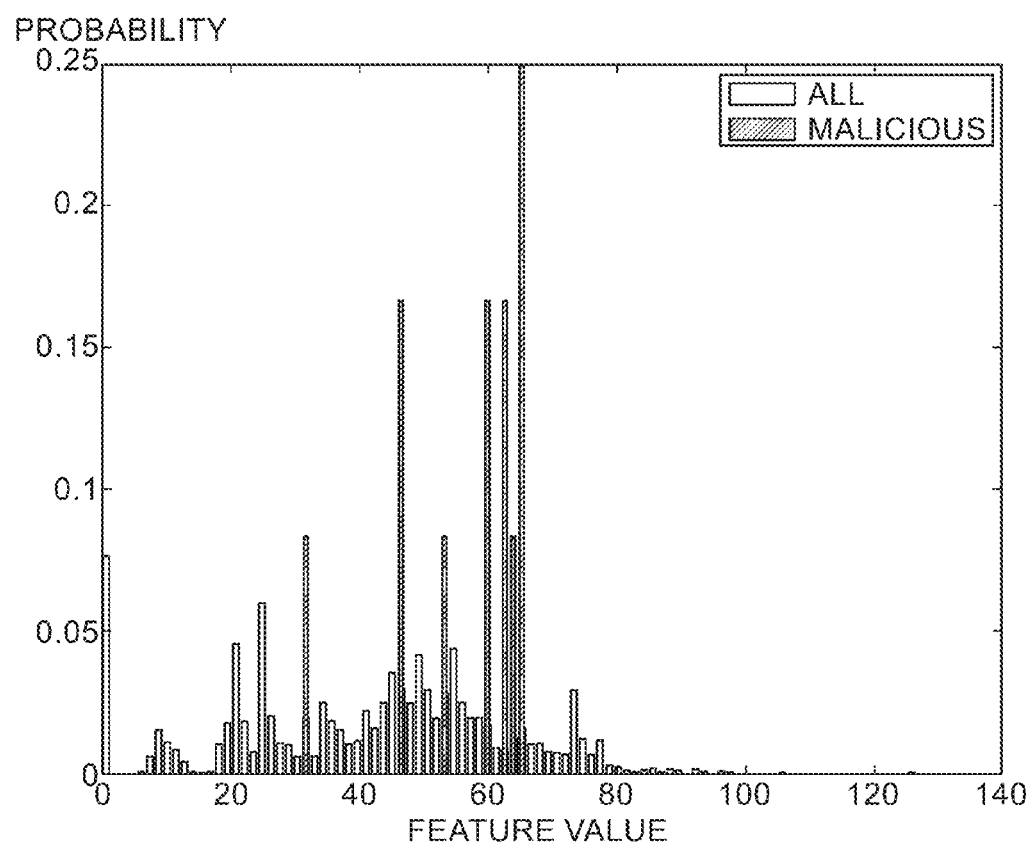

FIG. 4G is an empirical distribution of the number bytes weighted by target autonomous system exclusivity feature showing and contrasting the probability of various feature values for all connections and malicious connections in the actual dataset.

Figure 4H:
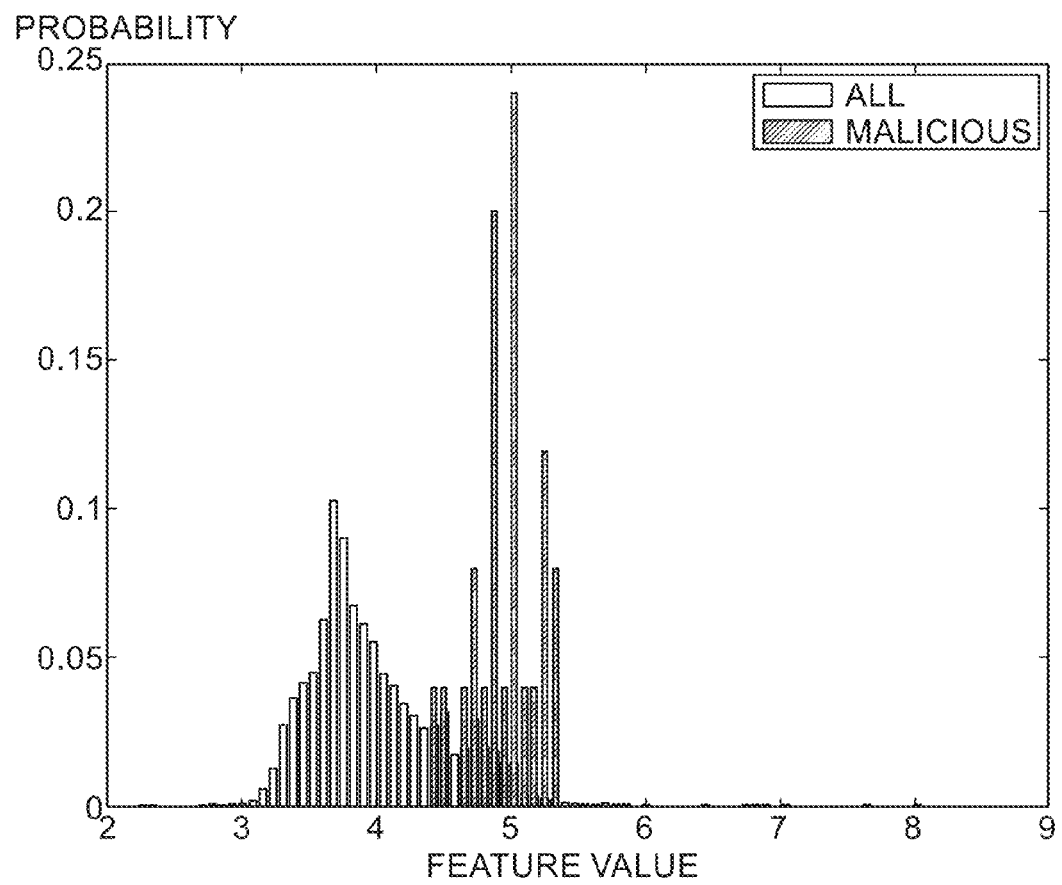

FIG. 4H is an empirical distribution of the user's daily activity match feature showing and contrasting the probability of various feature values for all connections and malicious connections in the actual dataset.

Figure 4I:
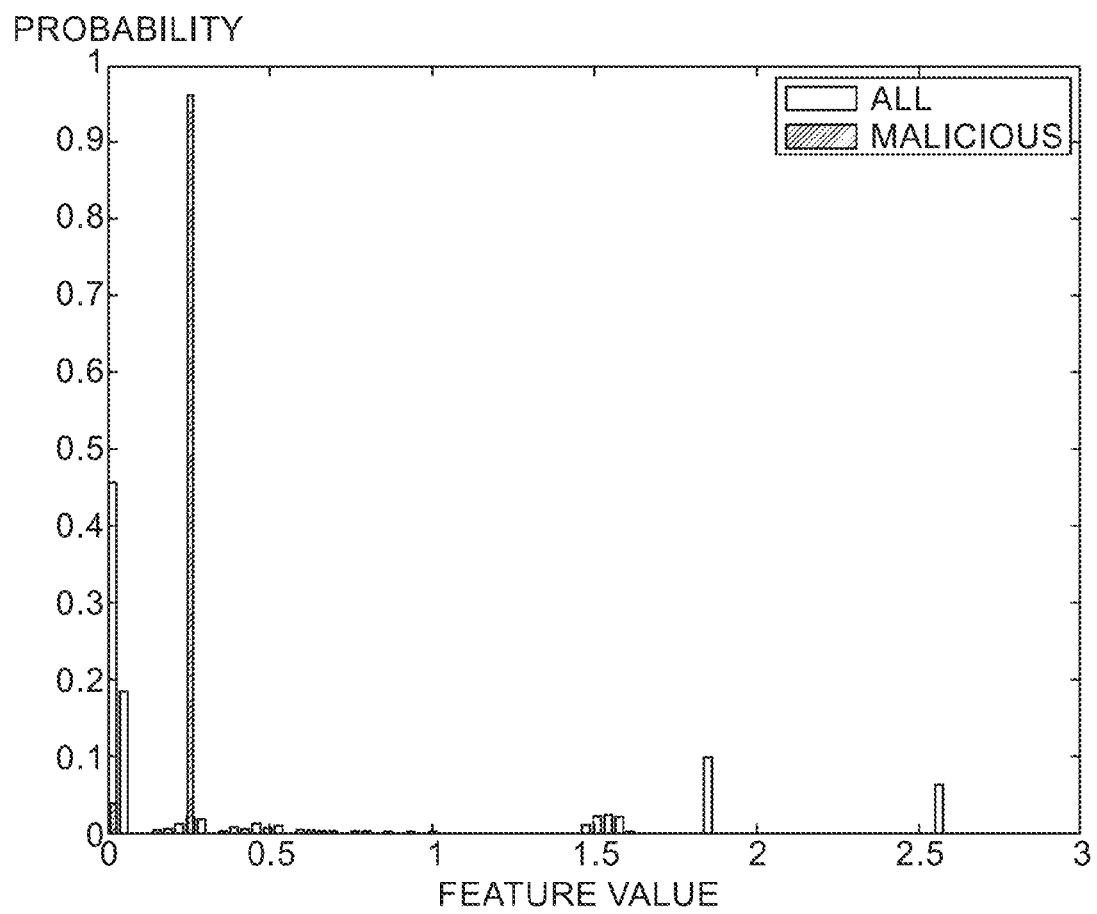

FIG. 4I is an empirical distribution of the remote service entropy feature showing and contrasting the probability of various feature values for all connections and malicious connections in the actual dataset.

Figure 4J:
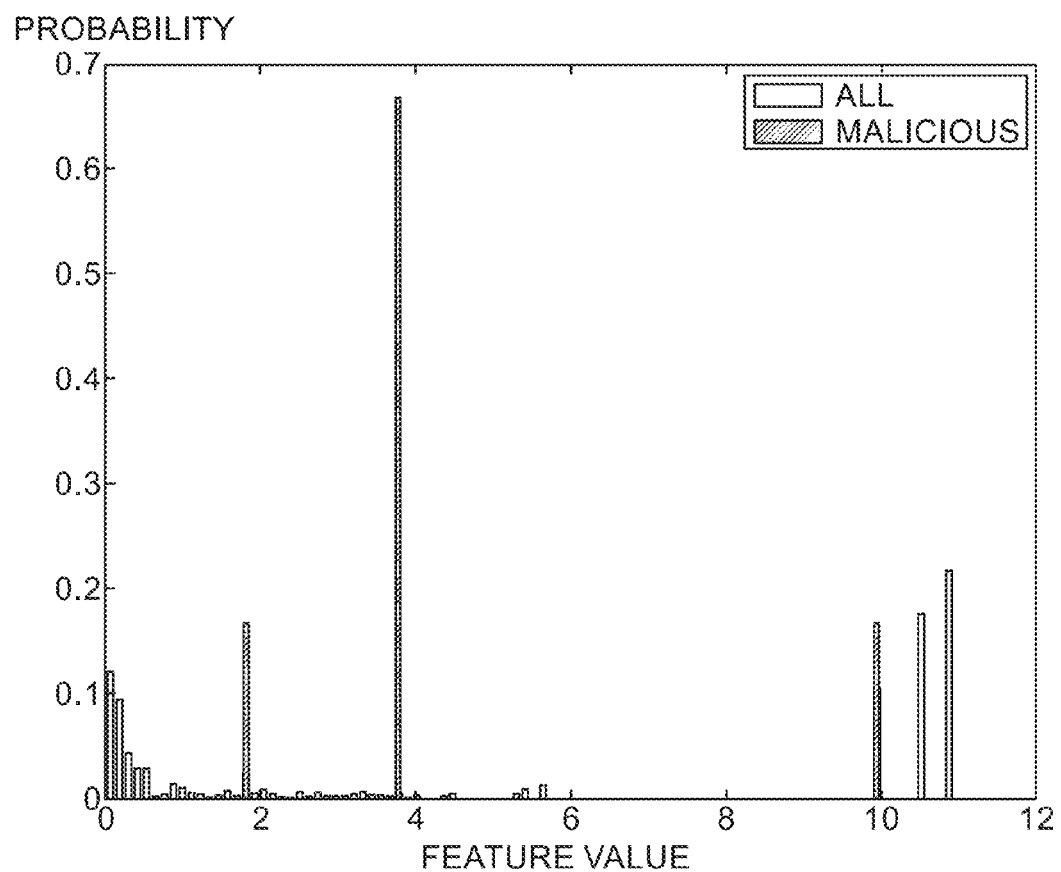

FIG. 4J is an empirical distribution of the remote service ratio feature showing and contrasting the probability of various feature values for all connections and malicious connections in the actual dataset.

The distributions of features depicted in FIGS. 4A-4J show probabilities of specific values of the given statistic (for the two groups—all persistent connections and malicious persistent connections).

Implementation

It is appreciated, in view of the above discussion, that measuring persistence of connections may require large amounts of memory. Consider, for example, a bin size set to 1 day, in order to capture lightweight and infrequent connections. This bin size, with its accompanying default observation window size of 10 bins means that effectively, 10 days' worth of connection records have to be stored. The memory requirements to store 10 days' worth of connection records, particularly on huge networks with little or no central administration, for example, may be very large; even more so if point-to-point traffic is common on such a network.

One approach to overcoming these issues would entail keeping all encountered connections as keys and their observation windows as values in a map, as described in Frederic Giroire, Jaideep Chandrashekar, Nina Taft, Eve Schooler, and Dina Papagiannaki. 2009. Exploiting Temporal Persistence to Detect Covert Botnet Channels. In *Proceedings of the 12th International Symposium on Recent Advances in Intrusion Detection* (RAID '09), Engin Kirda, Somesh Jha, and Davide Balzarotti (Eds.). Springer-Verlag, Berlin, Heidelberg, 326-345. Observation windows can seemingly efficiently be represented by bit arrays. However, because of the need to keep the keys in memory as well, in order to access the observation windows, the keys are represented by a structure that holds all of the information, i.e., a host IP address as well as the tuple, (ip address; port; and protocol) for the connection. A key would have to be kept in memory as long as there is at least one bit set to 1 in the binary array for that key's observation window. In effect, these keys occupy more memory than the actual data (i.e. the observation windows) does. By way of example, on a 40 Gb/sec network with maximum 8 hour window sizes, with 10 bins in the observation window, this implementation has been empirically determined by the inventors of the present invention to require approximately 12 GB of memory for the particular traffic patterns present in the networks 40 Gb/sec network described above. If this scheme were to be optimized the memory requirement could be reduced to approximately 6 GB. It is appreciated that optimization is implementation specific. By way of example, in a Java environment, optimization may be performed by not representing each vector with a new object but some very common bitmaps (i.e. observation windows) may be represented by only one object and shared by various persistent connections. Doing so saves memory and also time required for memory management. Another optimization may be performed algorithmically, i.e. some persistent connections are removed even before reaching zero persistence, because it can be shown that if the persistent connection reaches certain age, even if the persistent connection started to be active and its persistence value would increase each time step, the original only occurrence value would be erased before becoming persistent and thus it would be pointless to keep it in memory.

Accordingly, optimization of the storage of this data should attempt to limit the storage of the connection data (i.e. the keys). The inventors of the present invention have used a Bloom filter, which is a probabilistic data structure well known in the art, to reduce the memory requirements of the system by limiting the storage of the keys. A Bloom filter is a memory-efficient set representation. A Bloom filter can be used to determine whether a certain element is contained in the set represented by the Bloom filter with a one-sided error. That is to say, a query of the Bloom filter returns either "possibly in set" or "definitely not in set". The Bloom filter will not be wrong if it returns "definitely not in set". Bloom filters use a combination of hashing functions and bit fields. Additionally, Bloom filters can guarantee a false positive probability if the number of elements in the set to which the Bloom filter is applied does not exceed a certain threshold specified during the creation of the Bloom filter.

In order to utilize Bloom filters the data storage scheme needs to be redesigned. An array of n Bloom filters is kept, where n is the size of the observation window, instead of keeping a map with connections as keys and their respective observation windows as values. However, only one observation window is then kept for all connections.

An occurrence of a connection is then recorded by applying the connection to the Bloom filter which represents the current bin. Each bloom represents one bin. Therefore the number of Bloom Filters is equal to the number of bins in the observation window. (This is in the case that there is no extension of the bloom filter caused by excessive traffic. Note that only one observation window is kept for all connections.)

The persistence of a connection is then determined by dividing the number of Bloom filters which contain the connection (i.e. which indicate that the connection is "possibly in set") by the total number of Bloom filters in the array.

The sliding of the observation window is implemented by removing one Bloom filter (typically, the oldest of the Bloom filters would be the one removed) and adding a new Bloom filter.

The following three issues need to be addressed when using Bloom filters instead of sets and maps:
1. What is the rate of false positives of this implementation?
2. How are all persistent connections enumerated?

3. How is the size of the Bloom filters determined (bearing in mind that this parameter needs to be known in advance)?

Rate of False Positives of this Implementation

As is known in the art, Bloom filters provide a guarantee of the false positive rate, given that their capacity (i.e. the threshold limiting the number of elements in the set to which the Bloom filter is applied) is not exceeded. The false positive rate can be arbitrarily chosen and impacts the size of the Bloom filter. In some embodiments of the present invention, the probability of a connection being persistent is of interest, and not the false positive rate of an individual Bloom filter. Thus, what is significant is the probability of a connection which is not persistent being reported as being persistent. This probability, denoted Prob(error), differs based on the true value of persistence of the connection and the persistence threshold value, and can be expressed as:

$$\text{Prob(error)} = \sum_{i=p_t-p(c)}^{size_o-p(c)} \binom{size_o - p(c)}{i} fpp^i(1-fpp)^{(size_o-p(c)-i)}$$

where: p(c) is true persistence of connection multiplied by the size of the observation window;

$p_t$ is the persistence threshold;

$size_o$ is the size of the observation window; and fpp is the false positive probability of the used Bloom filters.

By way of example, if Bloom filters are used with 1% false positive probability and a persistence threshold of 0.6, then the probability that a connection with persistence 0.5 would be reported is less than 5% and the probability that a connection with persistence 0.4 would be reported is less than 0.1%.

Enumeration of Persistent Connections

The detector of malicious persistence connections as implemented herein preferably uses a set of all persistent connections as input. The Bloom filter implementations of persistence measurement, therefore, may be used in order to enumerate all connections that exceed the persistence threshold. Bloom filters themselves cannot enumerate all items in the set they "contain". Thus an extension of the Bloom filter is needed to enable said enumeration.

Figure 5A:
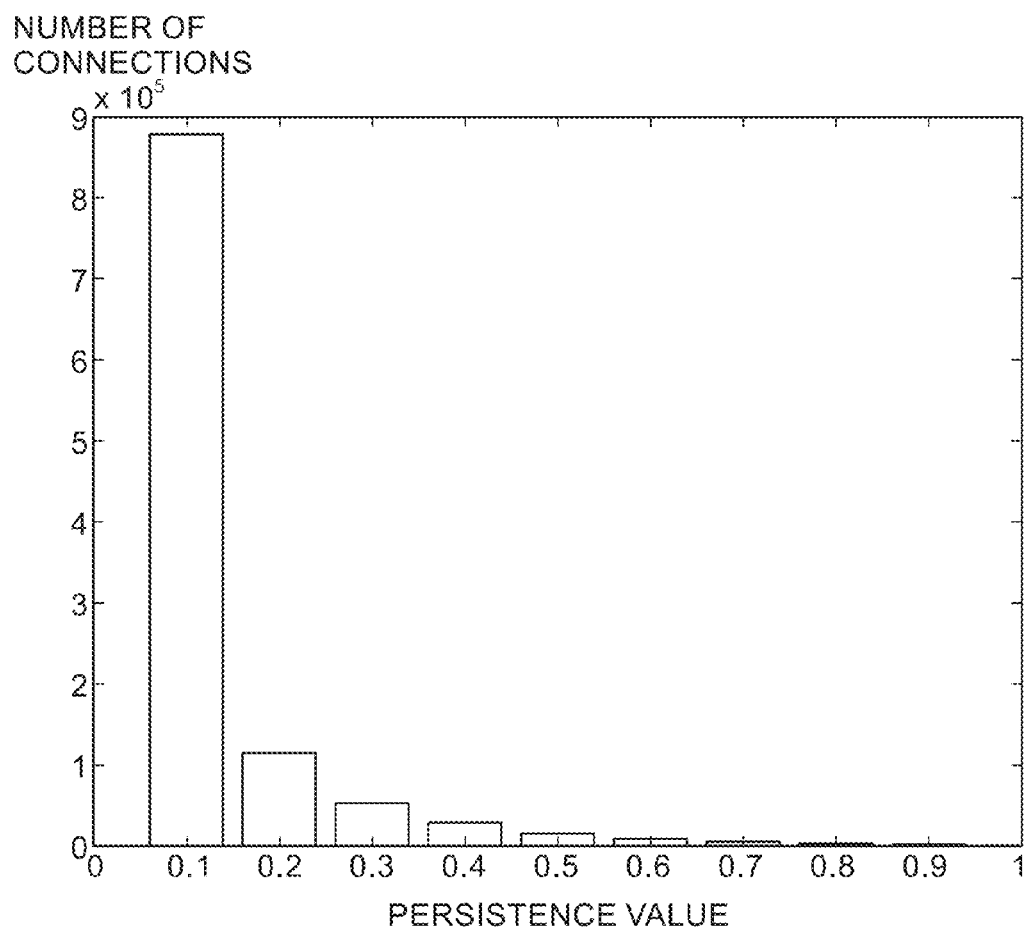
FIG. 5A is a histogram showing an empirically measured number of connections having a particular persistence value in a university network.
Figure 5B:
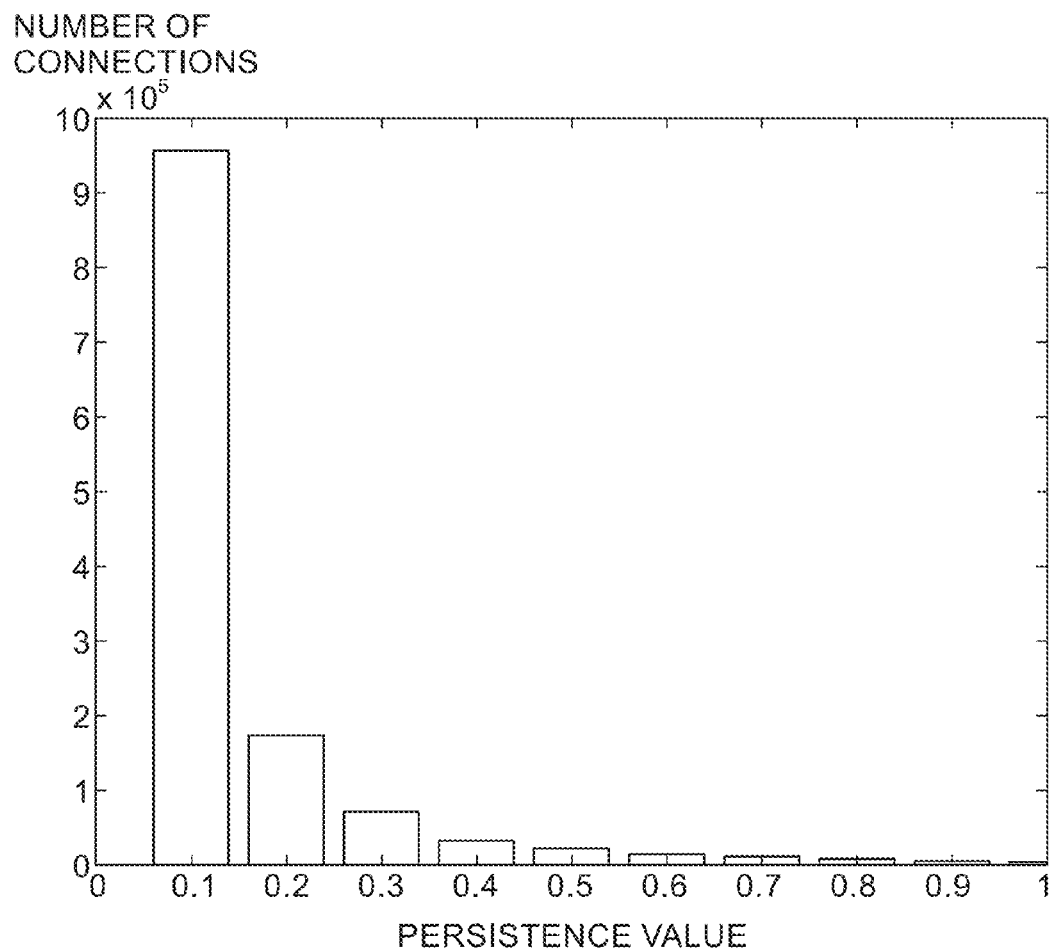
FIG. 5B is a histogram showing an empirically measured number of connections having a particular persistence value in a small corporate network.

Accordingly, in an embodiment of the present invention using Bloom filters, every time a connection is recorded, the connections persistence is checked after recording. If the connection exceeds the persistence threshold, then it is stored in a separate set containing only persistent connections. Hence knowledge of the persistence threshold is required in advance. Information about connections must also be recorded, as in the simpler implementation, without using Bloom filters. However, the number of connections for which this information is stored (i.e. only the connections in the set of persistent connections) is much lower than in the simpler implementation described above. By way of illustration that there are fewer connections requiring storage of data, reference is now made to both FIGS. 5A and 5B. FIG. 5A is a histogram showing an empirically measured number of connections having a particular persistence value in a university network. FIG. 5B is a histogram showing an empirically measured number of connections having a particular persistence value in a small corporate network. The empirical measurements represented in FIGS. 5A and 5B were performed over a 48 hour period.

Setting the Bloom Filter Size

As is known in the art, false positive probability guarantees of the Bloom filters are based on an assumption that the Bloom filter's projected capacity is not exceeded. The projected capacity must be known before the creation of the Bloom filter. Since network traffic follows trends based on the type of the network, the size of the Bloom filter should vary, depending on the time of the day and the time of the week. For example, in a corporate network, the traffic volume is expected to be at its highest values during work days between 8:00 AM and 6:00 PM. A corporate network is less likely to be in use over weekends. In order to determine proper size of the Bloom filters, a memory which stores maximal encountered traffic volume for specific days of the week and hours of the day is employed. When a Bloom filter is about to be created, its size is then determined based on the maximal traffic in the period of time during which the Bloom filter is to be active.

It is appreciated, however, that a sporadic event may occur in the network, for example a huge network scan or a distributed denial of service attack, and the number of connections in the network will rise significantly while this event is in progress. In the case of such an event a safeguard is employed that monitors the number of connections which are input to the Bloom filter. If the number of connections input to the Bloom filter reached the projected size value, then a new Bloom filter is created and new connection occurrences are stored in the newly created Bloom filter. Queries about connections are now executed on both the original Bloom filter and the new Bloom filter.

It has been empirically observed by the inventors of the present invention that when an embodiment using Bloom filters is run on the same data as an embodiment where all connections are stored in memory, that the implementation using Bloom filters requires around 800 MB of memory.

In order to provide feature values for building the feature vectors, as mentioned above, the statistic collectors are typically regularly updated with new data and also need to store the newly collected data. As was mentioned above, statistics collectors located at the networking equipment such as repeaters, bridges, switches 150 and routers 160, continuously collect flow data. Only flows of data belonging to connections of interest are selected and used for updates.

Outlier detection is then performed from time to time, for example, hourly, in this exemplary implementation, and thus, feature vectors need to be built by the system in a timely fashion. It follows that the statistics collectors need to store at least the data from the last hour of network traffic. Storing only the last hour of statistics about network traffic may not always be sufficient, because of the low robustness of outlier detection. It is appreciated that the more data that is collected, the "smoother" and more reliable the results will be. If there is only a small amount of data, then outlier detection might not be robust, i.e. providing results that change dramatically from hour to hour (e.g. one connection is found to be malicious, then legitimate, then malicious again—it changes every hour). That is to say, the more data that is available, the more the results become smoother and more reliable. For example, during the night, when total traffic volume is typically smaller, the results of outlier detection can become relatively unstable from hour to hour. Accordingly, a floating memory is used for the statistics collectors. Each of the statistics collectors has its own list containing data collected during the last n hours, where n is a preset length of the floating memory for a given collector. That is to say, the memory length is set for each of the statistics collectors individually and independently. The feature values provided for feature vectors to be constructed are based on aggregation of data from the entire statistic collector's memory. The statistics collectors can thereby store different data structures, and thus, for each of the collectors there is a data aggregator which handles aggregation of data from the floating memory.

Evaluation of Test System Results

Anomaly detection techniques can be sensitive to the network they are deployed on. An algorithm which is optimized for a corporate network which has strict and centralized security rules might not perform well on a network operated by a telecommunications provider where there is no centralized enforcement of rules and every user is free to do what he wants. Therefore, some embodiments of the present invention have been tested using three datasets that were collected from different types of networks. Data collected from each of these three networks were in a form of five-minute batches containing Cisco NetFlow (commercially available from Cisco, see: www.cisco.com/en/US/partner/products/ps6601/product-s_ios_protocol_group_home.html) records collected from hardware or software probes installed in the networks. Cisco NetFlow provides a set of services for IP applications, including network traffic accounting, usage-based network billing, network planning, security, Denial of Service monitoring capabilities, and network monitoring. It is appreciated that Cisco NetFlow is one example of a system which can be used with the method and system described herein. Any appropriate system which supports NetFlow/Internet Protocol Flow Information Export (IPFIX) format may be used with the method and system described herein.

The first dataset is from a university network where only a few restrictions exist. Namely, on some (not all) subnets the incoming UDP traffic is blocked; and no outgoing connections to port 25 (i.e. SMTP) over TCP are allowed. Other than that, there are no restrictions and users generally have root access to the machines they are using. The university network has several subnets, with users using Windows, Linux and Mac OS systems. The dataset which was collected spans 32 hours and contains approximately 1000 users with public IP addresses and many other users behind gateways.

The second data set was collected from a network within a manufacturing company. This company puts heavy emphasis on their intellectual property rights protection. It is a highly controlled environment. The number of users within that network is approximately 800. The data was collected over two days.

The third data set is from the public sector with data coming from a single provider serving several government offices and schools, having, all together, thousands of users. This is a rather heterogeneous environment with government offices having strict IT administration and schools having very loose to none centralized computer administration. This data set was shorter, covering only about 12 hours of traffic.

The data sets were not labeled, i.e. there was no ground truth available. That is to say that there was no standard data set to which one of the data sets were comparable. Labeling data sets is very time consuming; and with only the Cisco NetFlow data available, the labeling was limited in scope. Since embodiments have been developed for finding malicious persistent connections, only persistent connections need to be labeled. This reduces the size of the problem considerably. Nonetheless, it is impractical to manually label all persistent connections.

Rather, this task was approached in a semi-automatic way. First, HTTP connections and non-HTTP connections were separated. Non-HTTP connections were labeled manually. HTTP connections were labeled automatically using virustotal.com, a free online service that analyzes suspicious files and URLs and facilitates the quick detection of viruses, worms, Trojans, and all kinds of malware, in the following fashion: persistent connections were labeled as malicious if a remote IP-address was contacted by at least one binary that was detected by at least 10 different anti-virus engines as a malicious binary, according to the virustotal.com database.

The inventors of the present invention were aware of the high false-positive probability when labeling connections malicious based on the virustotal.com reports. Therefore, the inventors manually reviewed and verified all results of automatic labeling and removed connections that were not apparently malicious. By way of example, an IP address belonging to a major service provider was reported as malicious, but it was done so because of an advertisement served from that IP that was malicious. That does not mean that the IP address of the major service provider in question is, in general, malicious. After removing those, most malicious persistent connections belonged to a small set of users, each user having several malicious persistent connections. This adds confidence in the chosen method of determining ground truth (i.e. for determining the accuracy of results from the data sets).

With the labeled data detection, performance was assessed using ROC curves (as mentioned above). Each point on the curve represents detection performance (expressed by TP (true positive) and FP (false positive) rate values in that point) for certain threshold values (which has associated the x % limit for reporting the most anomalous connections) of anomaly score that is used to determine which persistent connection will be marked as anomalous and which as normal. That is to say that outlier detection is performed and persistent connections are then ordered by their outlier/anomaly score (discussed above with reference to FIG. 2B). The higher the anomaly score, the higher the connection is in the list. Then 1% of all connections are selected from the list, TP and FP are determined, and a point is placed in the ROC. Similarly, continuing with 2%, 3% and so on.

Figure 6A:
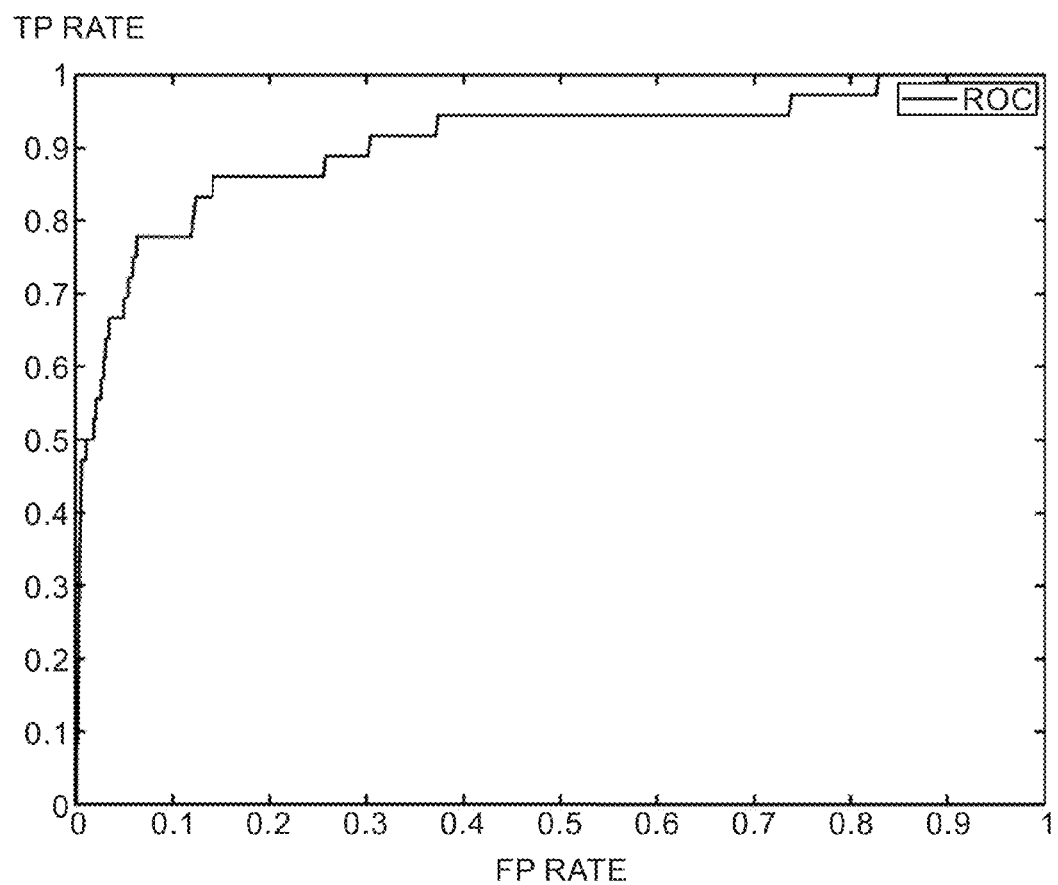
FIGS. 6A-6C are a set of ROC curves demonstrating detection results on a University network over time.
Figure 6B:
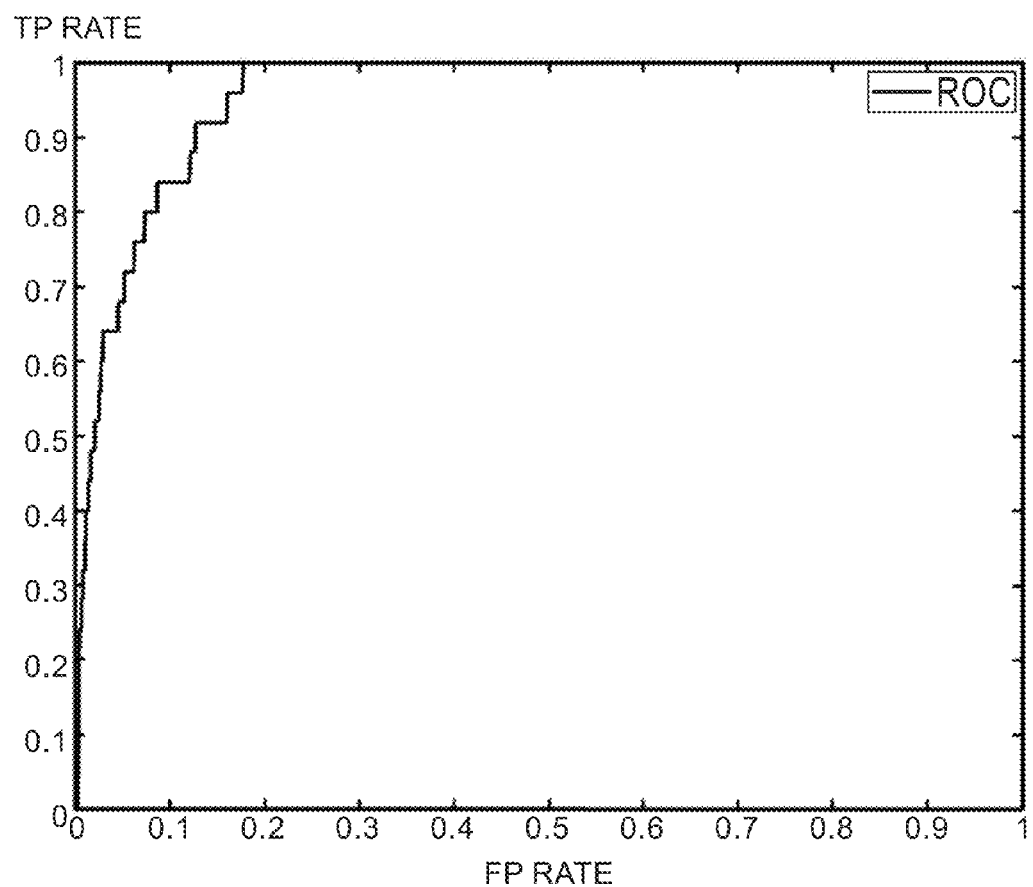
Figure 6C:
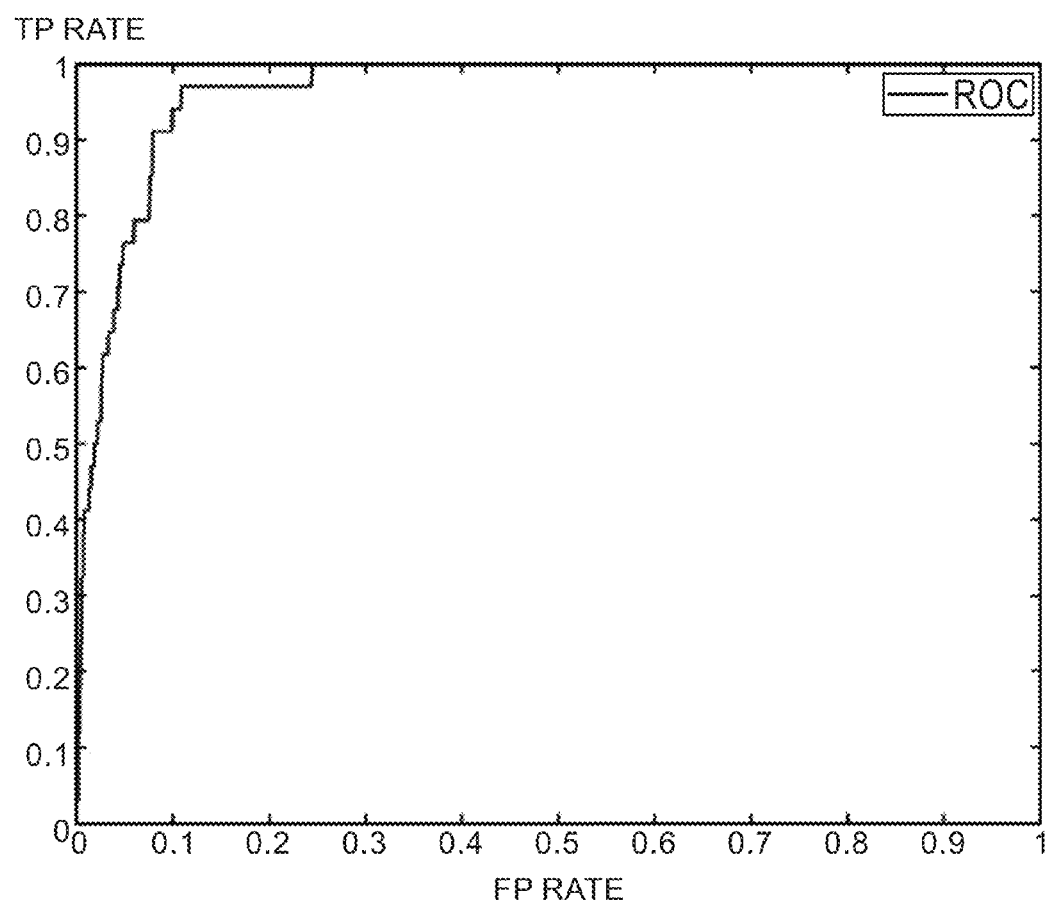
Figure 7A:
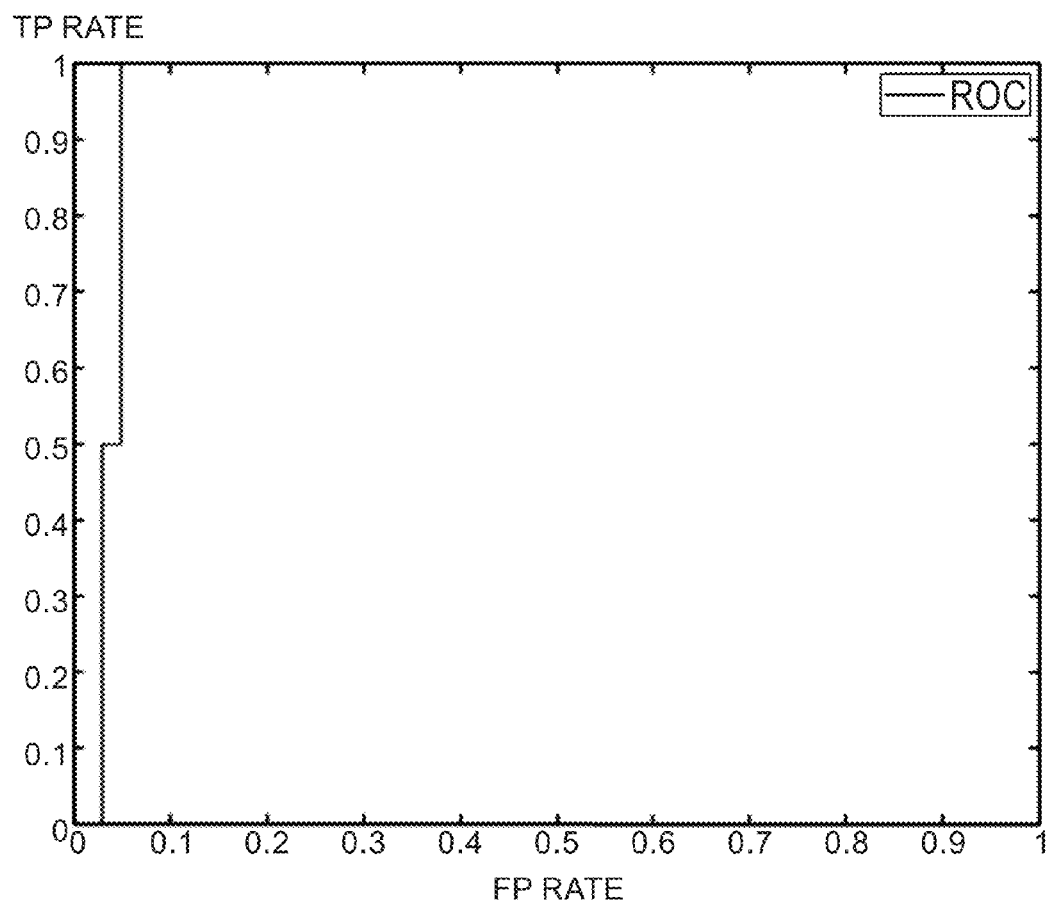
FIGS. 7A-7C are a set of ROC curves demonstrating detection results on a corporate network over time.
Figure 7B:
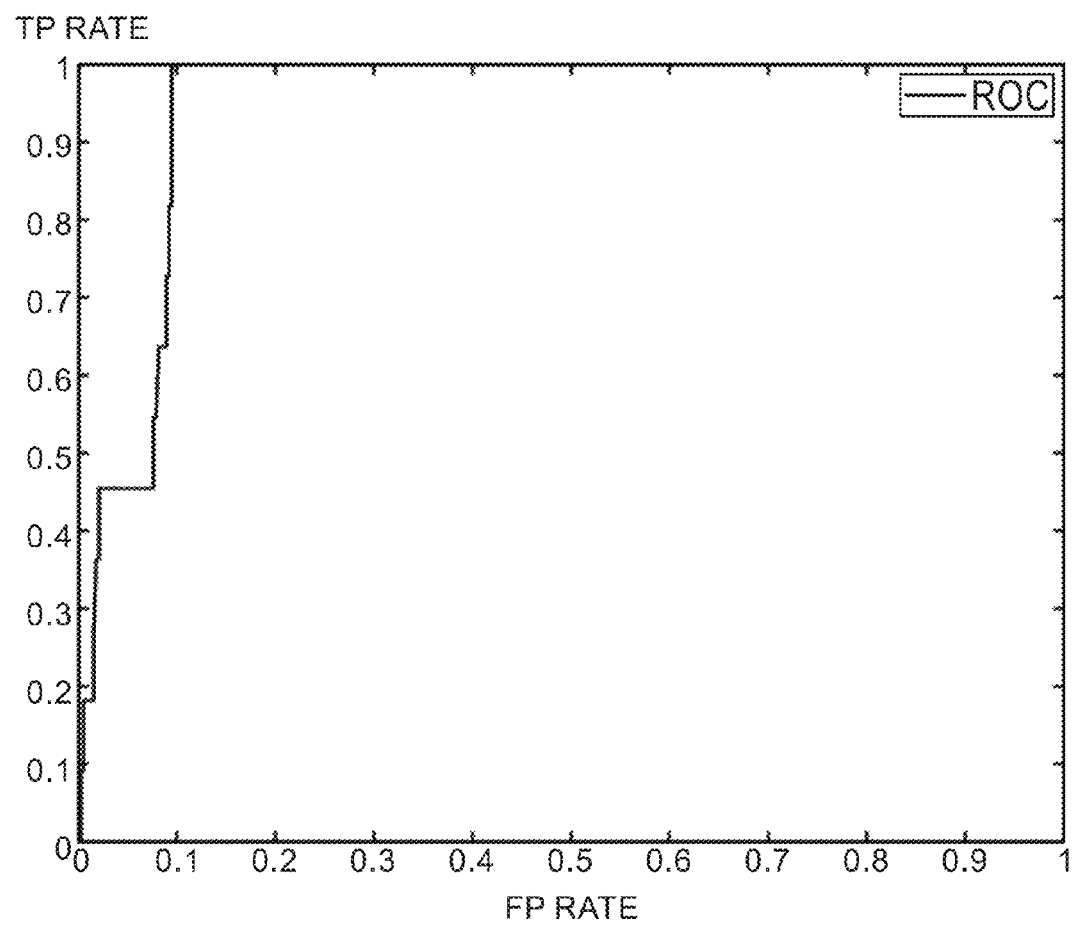
Figure 7C:
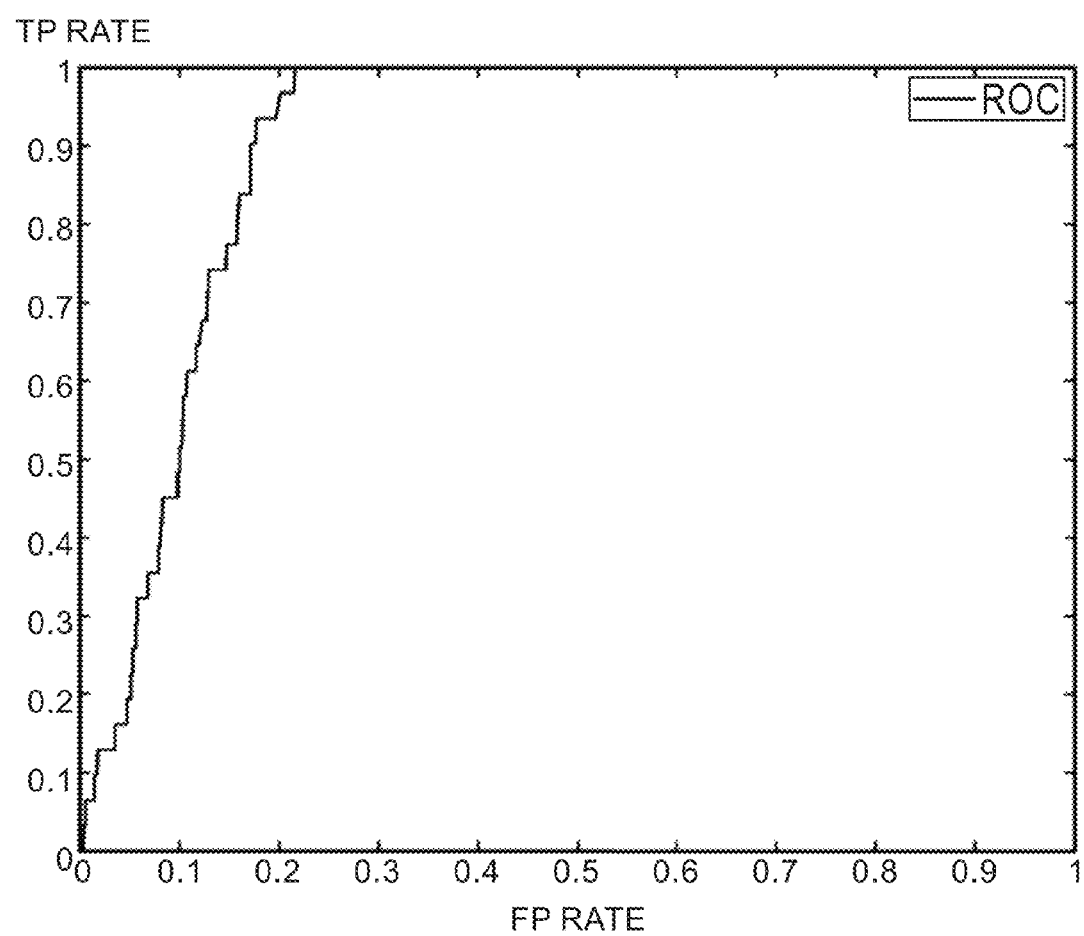
Figure 8:
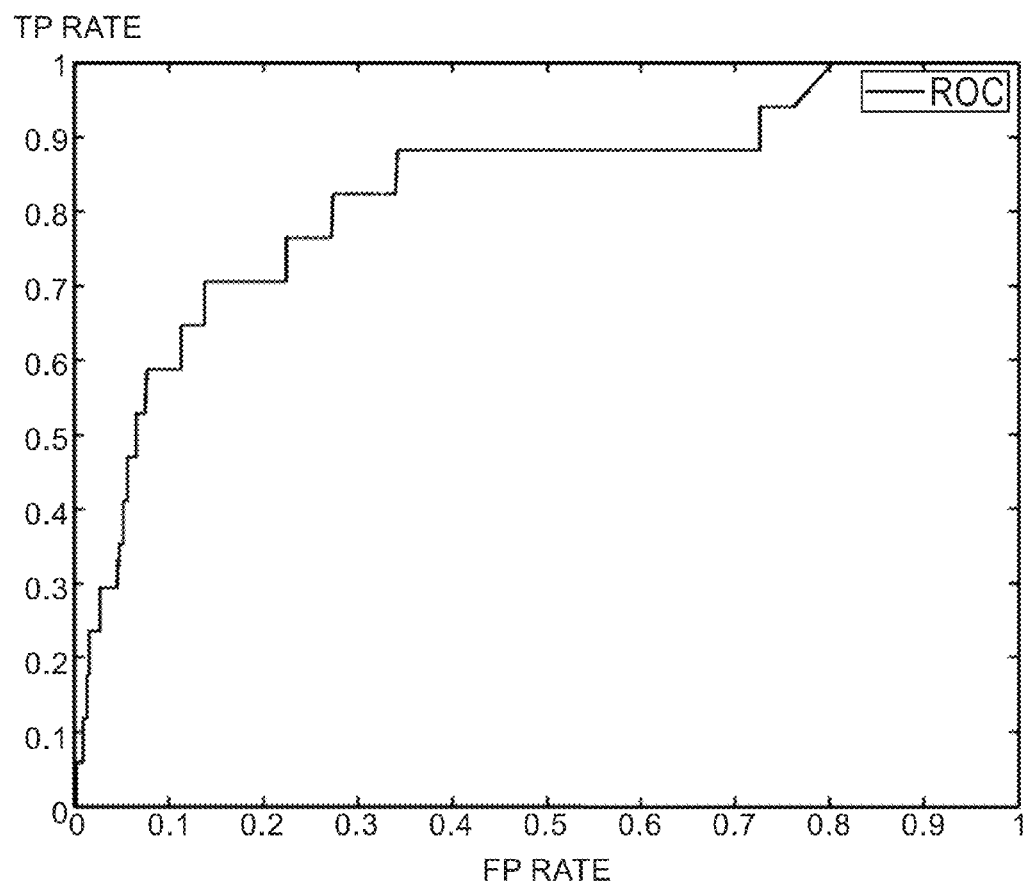
FIG. 8 is an ROC curve demonstrating detection results on a corporate network.

Another method for assessing the quality of malicious connection detection is to determine the number of malicious and legitimate persistent connections reported as anomalous depending on the value of limit x (i.e., depending on the total amount of all persistent connections that are reported as anomalous). ROC curves demonstrating detection results on the University network are shown in FIGS. 6A-6C, where FIG. 6A shows detection results after 9 hours; FIG. 6B shows detection results after 21 hours; and FIG. 6C shows detection results after 25 hours. The resulting curves for the corporate network are shown in FIGS. 7A-7C, where FIG. 7A shows detection results after 9 hours; FIG. 7B shows detection results after 21 hours; and FIG. 7C shows detection results after 43 hours. The results for the third data set, the one coming from the single ISP, are shown in FIG. 8. As the ISP data set was shorter than the other two, the results are presented for only one time point (after 6 hours of traffic). The graphs comparing amounts of malicious and legitimate connections reported as anomalous for given values of the limit x are presented in FIGS. 9A-9C. Looking, for example, at the results for the University network, the graph in FIG. 9A, indicates that if the 10% "most anomalous" of all persistent connections are reported, slightly under 10% of all legitimate connections will be reported as anomalous, while in case of malicious ones, about 85% will be reported as anomalous. Similar conclusions can be reached looking at FIG. 9B. In a similar way, the accuracy can be determined for the third data set (i.e. the ISP) presented in FIG. 9C, which shows a graph after 6 hours.

It can be seen from the results that what can be considered "the most proper" value of x which should be applied is dependent on the nature of the network, the network's size and also on the demands on the detection. The method described herein may be deployed either as a standalone method or as a filtering method. As a standalone method, the outlying connections are directly reported to a security analyst/administrator. As a filtering method, for example, further automatic detection mechanisms receive the filtered network data. In this case the method reduces the amount of data that needs to be further processed while storing as many of the potentially malicious connections as possible (i.e., high recall).

Figure 9A:
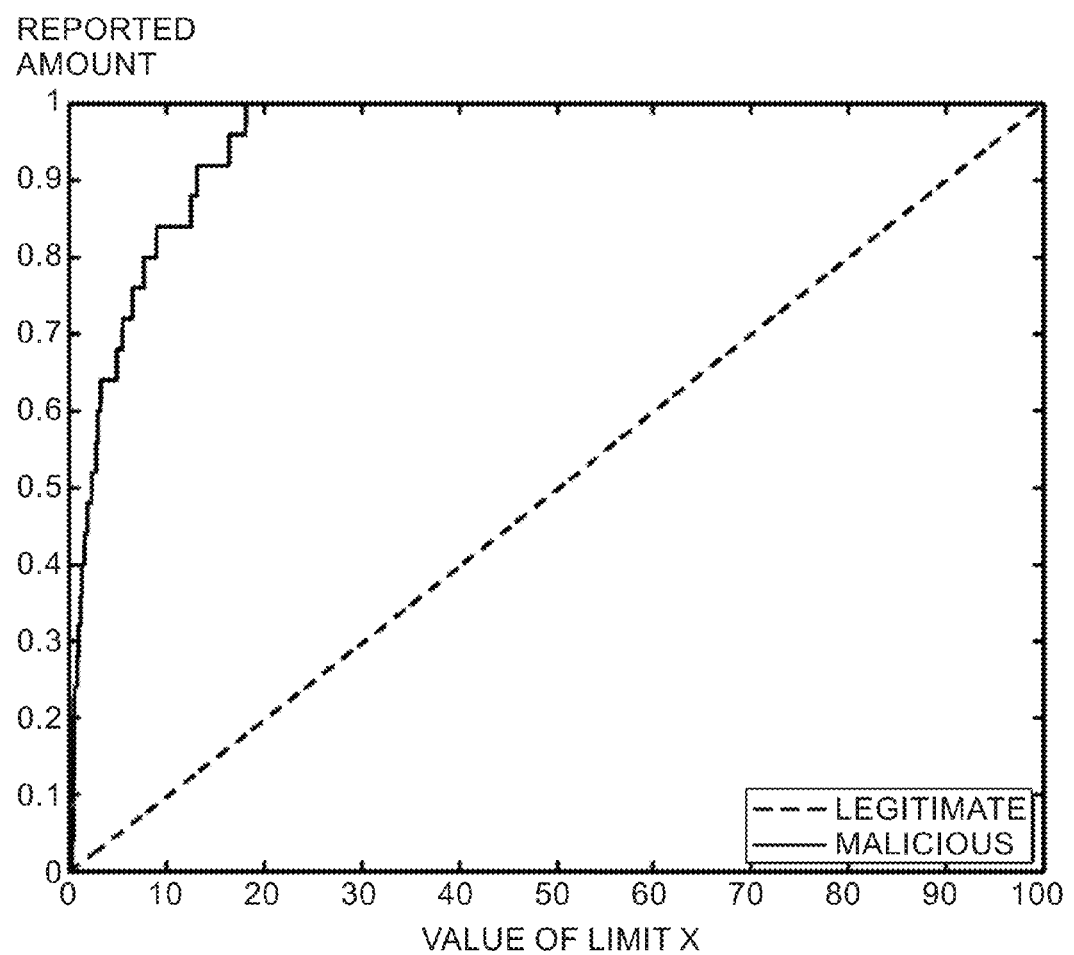
FIGS. 9A-9C are a set of graphs comparing amounts of malicious and legitimate connections reported as anomalous for given values of the limit x.
Figure 9B:
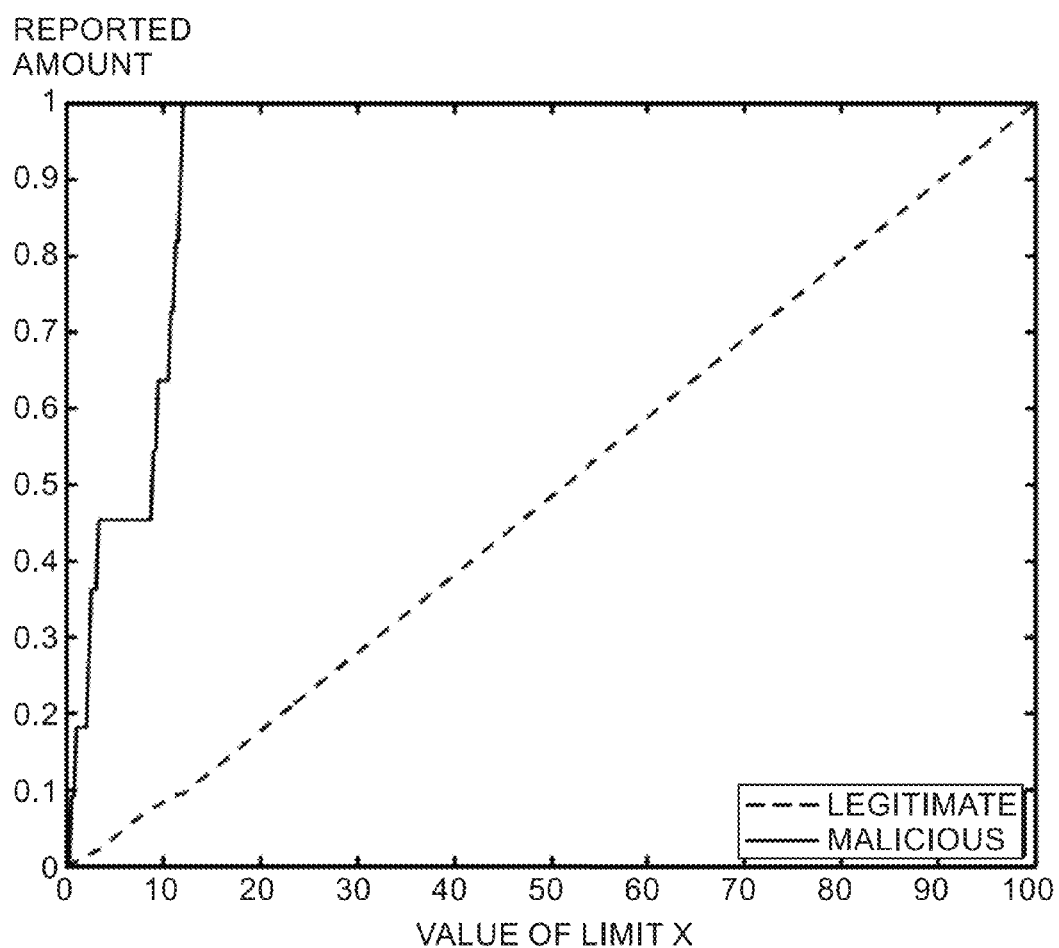
Figure 9C:
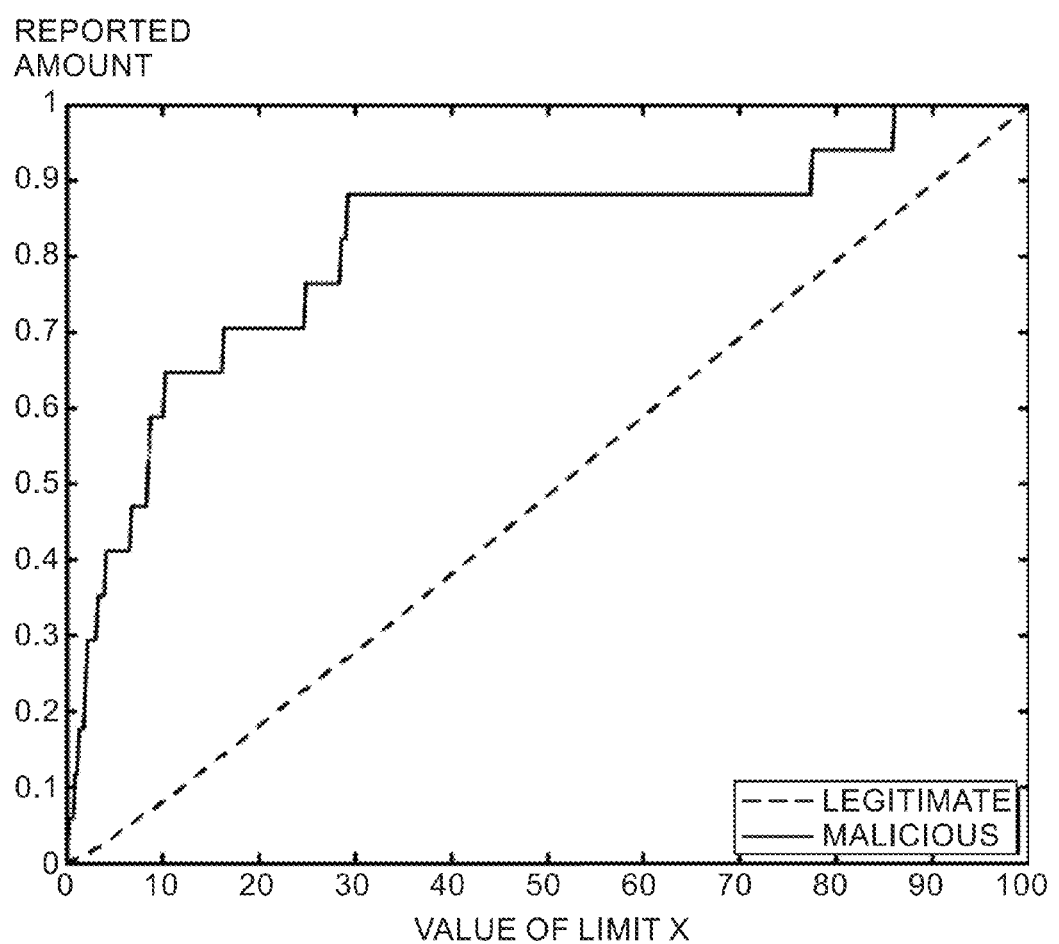

In any case, the present method for detecting anomalous persistent connections can markedly help with identification of malicious connections as demonstrated by the difference between amounts of reported legitimate and malicious connections, as shown in FIGS. 9A-9C.

The lower detection performance on the third dataset (i.e. the ISP) is probably caused by high heterogeneity of traffic in the network. As was mentioned above, this network is composed of many sub-networks that are very diverse, because they are operated in several different institutions or companies. The inventors believe that the detection could be improved if the detection on the entire network were to be divided to those sub-networks, such that the outlier detection would be performed on each sub-network separately. As can be expected, the legitimate traffic in the sub-networks could be better profiled by means of the feature values distributions, and the malicious activity could be better separated in that case.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof.

What is claimed is:

1. A method for detecting a malicious network connection, the method comprising:
   determining, for each connection over a network, if each connection is a persistent connection, wherein the persistence, p, of a connection is defined as:

$$p(c, W) = \frac{1}{n}\sum_{i=1}^{n} c_i b_i$$

where:
   c is the connection in question;
   $W=[b_1, \ldots b_n]$ is the observation window composed of n measurement windows; and
   $1c_j b_i$ is a function which is equal to 1 if the connection was active at least once during the measurement window $b_i$, otherwise the function $1c_j b_i$ is equal to 0;
   if, as a result of the determining, a first connection is determined to be a persistent connection, collecting connection statistics for the first connection;
   creating a feature vector for the first connection based on the collected statistics, wherein the feature vectors comprise more than one of the following features:
   logarithm of the total amount of bytes sent or received within the persistent connection;
   autocorrelation of time series generated by sent bytes of packets within the persistent connection; and
   ratio of bytes sent and received by the persistent connection;
   performing outlier detection for all of the feature vectors for all connections over a network which have been determined to be persistent connections, wherein the outlier detection is based on detecting deviation from an anticipated value of a curve of at least one feature of the feature vectors showing feature values versus probability; and
   reporting detected outliers.

2. The method according to claim 1 wherein the persistent connection comprises a connection where the connection occurs repeatedly in time.

3. The method according to claim 1 wherein a persistent connection is characterized as having a value $p \geq 0.2$.

4. The method according to claim 1 wherein a persistence threshold is where p in the range of 0.5-0.8.

5. The method according to claim 1 wherein the steps of determining if each connection is a persistent connection and collecting connection information are performed repeatedly.

6. The method according to claim 1 wherein the steps of creating the feature vector, performing outlier detection, and reporting detected outliers are performed repeatedly.

7. The method according to claim 1, wherein the feature vectors comprise more than one of the following features:
   average flow duration;
   flows inter-arrival times mean;
   flows inter-arrival times variance;
   target autonomous system overall surprisal;
   target autonomous system per-service surprisal;
   unique local ports count;
   bytes amount weighted by target autonomous system exclusivity;
   user overall daily activity match;
   remote service entropy; and
   remote service ratio.

8. The method according to claim 1 wherein the calculating statistics for the at least one identified connection of interest is performed using at least one Bloom filter.

9. The method according to claim 8, wherein, every time a connection is recorded in the Bloom filter, the persistence of the connection is checked right after recording the connection.

10. The method according to claim 8, wherein when a Bloom filter is to be created, its size is determined based on projected maximal network traffic in a period of time during which the to be created Bloom filter is to be active.

11. The method according to claim 8, wherein a safeguard is employed that monitors a number of connections which are input to the Bloom filter, if the number of connections input to the Bloom filter reaches a projected size value, then a new Bloom filter is created and new connection occurrences are stored in the newly created Bloom filter, and queries about connections are executed on both the original Bloom filter and the new Bloom filter.

12. The method according to claim 8 and further comprising using at least one Bloom filter in order to conserve memory.

13. The method according to claim 1 wherein the observation window is represented by a bit array.

14. The method according to claim 13 wherein encountered connections are stored as keys and a corresponding observation window for that key is stored as values in a map.

15. A system for detecting a malicious network connection, the method comprising:
a first hardware processor which determines, for each connection over a network, if each connection is a persistent connection, wherein the persistence, p, of a connection is defined as:

$$p(c, W) = \frac{1}{n}\sum_{i=1}^{n} c_i b_i$$

where:
c is the connection in question;
$W=[b_1, \ldots b_n]$ is the observation window composed of n measurement windows; and
$1c_i b_i$ is a function which is equal to 1 if the connection was active at least once during the measurement window $b_i$, otherwise the function $1c_i b_i$ is equal to 0;
a statistics collector which collects connection statistics for the first connection if the processor determined that a first connection is a persistent connection;
a second hardware processor operative to create a feature vector for the first connection based on the collected statistics, wherein the feature vectors comprise more than one of the following features:
logarithm of the total amount of bytes sent or received within the persistent connection;
autocorrelation of time series generated by sent bytes of packets within the persistent connection; and
ratio of bytes sent and received by the persistent connection;
an outlier detection processor which performs outlier detection for all of the feature vectors for all connections over a network which have been determined to be persistent connections, wherein the outlier detection is based on detecting deviation from an anticipated value of a curve of at least one feature of the feature vectors showing feature values versus probability; and
a reporter which reports detected outliers.

16. The system according to claim 15 wherein the persistent connection comprises a connection where the connection occurs repeatedly in time.

\* \* \* \* \*

UNITED STATES PATENT AND TRADEMARK OFFICE
CERTIFICATE OF CORRECTION

PATENT NO. : 9,344,441 B2
APPLICATION NO. : 14/485731
DATED : May 17, 2016
INVENTOR(S) : Jan Kohout et al.

Page 1 of 1

It is certified that error appears in the above-identified patent and that said Letters Patent is hereby corrected as shown below:

In the specification

Column 3, line 59, delete "$b_1$," and substitute therefor --$b_i$,--.
Column 7, line 14, delete "5," and substitute therefor --$s_c$--.

Signed and Sealed this
Twenty-sixth Day of July, 2016

Michelle K. Lee
*Director of the United States Patent and Trademark Office*